US005640319A

United States Patent [19]

Beuning et al.

[11] Patent Number: 5,640,319

[45] Date of Patent: Jun. 17, 1997

[54] SWITCH CONTROL METHODS AND APPARATUS

[75] Inventors: Brian George Beuning, Aurora; Seymour Bloom, Naperville; Raymond Eugene Bright, Jr., Plainfield; Steven Lloyd Greenspan, Oak Park; Joel M. Marks, Naperville; Michael James Morgan, Warrenville; Timothy Jerome Scale, Downers Grove; Bruce Fat Wong, Wheaton, all of Ill.

[73] Assignee: Lucent Technologies Inc., Murray Hill, N.J.

[21] Appl. No.: 672,065

[22] Filed: Mar. 18, 1991

[51] Int. Cl.[6] ............................ G05B 15/00; H04M 7/00

[52] U.S. Cl. .......................... 364/131; 379/219; 379/224; 379/272

[58] Field of Search .................................... 364/130–138; 370/84.1, 95.1, 60, 60.1, 110.1, 58.2, 16; 379/52, 59, 219, 220, 224, 225, 207, 242, 243, 271, 272, 273, 333, 334, 269, 230, 221

[56] References Cited

U.S. PATENT DOCUMENTS

| | | | |
|---|---|---|---|
| 4,611,094 | 9/1986 | Asmuth et al. . | |
| 5,021,968 | 6/1991 | Ferketic | 379/221 |
| 5,095,480 | 3/1992 | Fenner | 370/94.1 |
| 5,182,750 | 1/1993 | Bales et al. | 370/110.1 |
| 5,375,167 | 12/1994 | Bales et al. | 379/207 |
| 5,377,262 | 12/1994 | Bales et al. | 379/220 |

OTHER PUBLICATIONS

*Service Logic Interpreter Preliminary Description,* Bell Communications Research, Special Report SR–TSY–000778 Issue 1, Dec. 1987.

*Primary Examiner*—Paul P. Gordon

*Assistant Examiner*—Thomas E. Brown

*Attorney, Agent, or Firm*—Michael B. Johannesen; Gordon E. Nelson

[57] ABSTRACT

A system for employing a computer to control a device to provide a plurality of services for a plurality of entities. Each entity corresponds to exactly one of the services and each service has its own copy of the code which defines the service. The system associates a process which executes the service with each service. The code for a service defines a finite state machine which is continually executed by the service's process. While in a given state, the finite state machine may traverse a decision graph which is directly accessible to the process. Actions to be taken on traversal of a node of the decision graph may be defined in the finite state machine. The service's process communicates with other processes and with itself by means of interprocess messages. Each state of the finite state machine contains event handlers for responding to messages received by the service's process. The finite state machine is defined by a special language, the service, logi language, and the decision graphs are defined by means of a graphical editor. The compiler for the service logic language produces not only C++ code defining the finite state machine, but also data base and shell scripts which are used to provision and maintain the services. An embodiment of the system is disclosed which is used in a service node of a telephone switching network to provide telephone services such as 800 number service, caller ID, and the like.

19 Claims, 24 Drawing Sheets

| | | | | | | |
|---|---|---|---|---|---|---|
| DESCRIPTION FILE NAME (STRING) | | | | | | |
| DATE AND TIME OF CREATION (STRING) | | | | | | |
| NUMBER OF NODES IN THE DG (INT) | | | | | | |
| TABLE TYPE (STRING) | TABLE NAME (STRING) | TABLE ARGUMENT (STRING) | TABLE VALUE (STRING) | ........... | TABLE ARGUMENT (STRING) | TABLE VALUE (STRING) |
| | | | | ⋮ | | |
| TABLE TYPE (STRING) | TABLE NAME (STRING) | TABLE ARGUMENT (STRING) | TABLE VALUE (STRING) | ........... | TABLE ARGUMENT (STRING) | TABLE VALUE (STRING) |
| NODE TYPE (STRING) | NODE ID (INT) | NODE PARENT (INT) | BRANCH COUNT (INT) | CHILDREN (INT SEQUENCE) | PRIVATE DATA COUNT (INT) | PRIVATE DATA (STRING SEQUENCE) |
| NODE TYPE (STRING) | NODE ID (INT) | NODE PARENT (INT) | BRANCH COUNT (INT) | CHILDREN (INT SEQUENCE) | PRIVATE DATA COUNT (INT) | PRIVATE DATA (STRING SEQUENCE) |
| NODE TYPE (STRING) | NODE ID (INT) | NODE PARENT (INT) | BRANCH COUNT (INT) | CHILDREN (INT SEQUENCE) | PRIVATE DATA COUNT (INT) | PRIVATE DATA (STRING SEQUENCE) |
| | | | | ⋮ | | |
| NODE TYPE (STRING) | NODE ID (INT) | NODE PARENT (INT) | BRANCH COUNT (INT) | CHILDREN (INT SEQUENCE) | PRIVATE DATA COUNT (INT) | PRIVATE DATA (STRING SEQUENCE) |

```
fsm Service_1        #Caller hears a recent changeable TTS announcement
access
        my_dn                dn        } 1505
end access
rc
        Announcement1        string    } 1509
end rc                                                  } 1508   } 1507
measurement
        Service_status   every   60   minutes {
            TTS_succeeds               counter,
            TTS_fails                  counter,        } 1511
            Early_disconnects          counter }
end measurement
dynamic
        Caller_port       port      } 1513
end dynamic
state Initial
    event terminating_call
        set Caller_port = terminating_call.port
        send_answer (port = Caller_port)
        tts!send (port = Caller_port, text = Announcement
    end event terminating_call

    event tts!send_completed
        release_port (port = Caller_port)
        increment Service_status.TTS_succeeds              } 1517
    end event tts!send_completed
                                                           } 1515
    event tts!send failed
        release_port (port = Caller_port)
        increment Service_status.TTS_fails
    end event tts!send_failed

    event disconnected
        release_port (port = Caller_port)
        increment Service_status.Early_disconnects
    end event disconnected
end state Initial
end fsm Service_1
```

1502 (bracket enclosing entire listing)

```
type
TTS_final node terminate {
              Text string          } 1603
         }
end type

fsm DG_Service

access      #recent change data
my_dn           dn
end access

rc           #recent change data
  Graph1          decision graph
end rc                        1604

dynamic     #per call data
  Caller_port     port
  Caller_dn       dn
  Dialed_port     port
  Dialed_dn       dn
end dynamic

1615 { state Incoming_Call
         event terminating_call        1609
               ...
               dg!traverse Graph1
               next state Selecting_Route
         end event terminating_call        1611
       end state Incoming_Call

1615 { state Selecting_Route
         event TTS_final
               tts!send (port = Caller_port, text = TTS_final.Text)   } 1613
         end event TTS_final

         event tts!send_completed
               release_port (port = Caller_port)
         end event tts!send_completed
         .
         .
         .
```

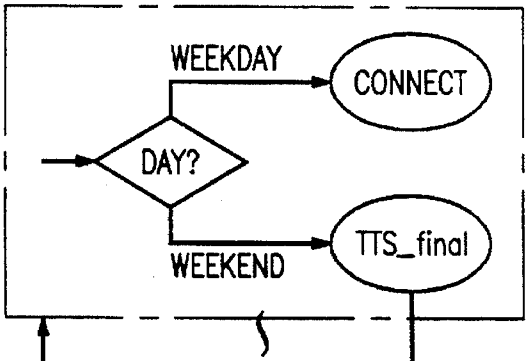

1607

| NODE SHAPE | DESCRIPTION | |
|---|---|---|
| DIAMOND ◇ | DECISION NODE | 1901 |
| RECTANGLE | HAND-OFF NODE | 1903 |
| OVAL | FINAL NODE | 1905 |
| PENTAGON W/CIRCLE | PCV NODE | 1907 |
| ARROW | ROOT NODE | 1909 |
| PENTAGON | ASSIGN NODE | 1911 |
| TRAPEZOID > | GOTO NODE | 1913 |
| TRAPEZOID < | COME IN NODE | 1915 |

2001

2601

SWITCH CONTROL METHODS AND APPARATUS

BACKGROUND OF THE INVENTION

1. Field of the Invention

The invention relates generally to the use of computers to control devices and more specifically to the organization of systems in such computers for controlling devices to provide services for entities. One class of such devices is switches in telephone networks, and the invention may be employed to provide services such as locator services, 800 number services, or caller announcement to customers of a telephone network.

2. Description of the Prior Art

The advent of stored-program controlled networks has provided telephone companies with the means for providing their customers with many services other than simply connecting a caller to the number he dialed. Examples of such services are 800 number services, locator services, caller ID services, and so on. Such services have become enormously popular and are an important source of revenue for the companies which provide them and for the manufacturers of the hardware and software used in the stored program controlled networks. Further, given the programmability of the network, the variety of such services is limited only by the imaginations of those who create them.

The popularity of these services and their potential variety has made it imperative that the telephone companies and their hardware and software suppliers find easier ways to create and modify services. At present, programmable devices in the stored-program controlled networks execute what is called generic code for the device. Services offered by the device are part of the genetic code. Consequently, adding or modifying a service requires modification of the generic code. Such modifications are difficult and time-consuming, first because of the complexity of the genetic code and second because of the need for careful and exhaustive testing to detect defects in the genetic code which might cause failure of the device controlled by the genetic code or even catastrophic failure of the network.

FIG. 26 shows two prior-art techniques for making the creation and modification of services easier. The first technique is a partitioning of the generic code which makes addition and modification of services easier; the second is employing a data structure called a decision graph to modify a service without changing the code for the service. The figure shows both techniques as they might be embodied in devices of a stored program controlled network 2601 of the type in which the devices of the network communicate by means of the common channel interoffice signalling facilities (CCIS), a signalling channel which is separate from the telephone lines controlled by the network and by means of which the program controlled devices in the network can send and receive control messages.

The devices shown in FIG. 26 are a switch 2603 and a network control point 2605. Switch 2603 includes switching hardware 2609, which has incoming lines 2611 and outgoing lines 2613 and receives calls on incoming lines 2611 and outputs them on outgoing lines 2613. Network control point 2605 includes a network control point data base 2607, which contains information employed in some services. For example, with 800 number services, data base 2607 specifies for each 800 number the actual numbers of the telephones to which calls made to the 800 number are to be routed. Included in the information for some services are decision graphs 221.

Switch hardware 2609 and network control point data base 2607 are controlled by control computers. Switch 2609 is controlled by switch control computer (SCC) 2607. Operation of control computer 2607 is controlled by switch control process 2615, which executes service code 2617. Service code 2617 defines a number of services and consists of service specific code (SSC) 2619 for each service and service library code (SLC) 2621, which is shared by all services. As shown by the arrows leading to and from service control process 2615, while executing service code 2617, service control process 2615 provides control signals to and responds to control signals from switch hardware 2609, provides CCIS messages to and receives CCIS messages from message interface 2625, which is connected to the control channel, and writes data to and reads data from service data 2623.

Network control point data base 2607 is controlled by network control point computer 2609. Controlling computer 2609 is network controlpoint control process 2611, which executes network control point code 2613. As indicated by the arrows, as it does so, it executes queries of network control point data base 2607, reads and writes network control point data 2616, and provides CCIS messages to message interface 2629 and receives them from message interface 2629.

The 800 number service described above can serve as an example of how the components of stored program controlled network 2601 cooperate to provide a service. Provision of the service begins when switch hardware 2609 receives the 800 number. In response to the 800 number, switch control process 2615 uses a table in service data 2623 to determine which service specific code 2619 in service code 2617 corresponds to the 800 number specified by the caller and begins executing that service specific code. The service specific code invokes routines in service library code 2621 which, when executed by service control process 2615 cause message interface 2625 to send a message via CCIS 2627 to NCP 2605 which contains the 800 number. On receipt of the message, NCP control computer 2609 queries data base 2607 to determine the telephone number to which the call to the 800 number should be directed. Data base 2607 determines the telephone number, perhaps by using a decision graph 221 corresponding to the 800 number, and returns the telephone number to control computer 2609, which in turn sends it via CCIS 2627 to service control computer 2607. On receipt of the message containing the number, service control process 2615 causes switch hardware 2609 to route the call to the number.

As will be described more extensively in the following Detailed Description, decision graph 221 is a tree data structure which describes a set of alternative actions and rules for which of the alternative actions to take. In the 800 number context, the alternative actions are simply alternative destinations for the call to the 800 number; which alterative is taken may depend on the caller's location or the time at which he makes the call. As is apparent from the foregoing, the use of decision graphs to define alternative destinations of calls to 800 numbers permits modification of the 800 number service for a given 800 number without modification of service specific code 2619.

While the partition of service code 2617 and the use of decision graphs in network control point 2605 make modification of services easier and faster, there is still room for improvement. In particular, because all services executed by service control processor 2615 use a single copy of service code 2617, a change in that copy can potentially affect every service executed by service control process 2615; in particular, changes to service library code 2621 must be made with the same care as changes to generic code. Further, a defect in service specific code 2619 can cause service control process 2615 to overwrite data in service data 2623 belonging to services other than the one corresponding to service specific code 2619, and can thereby cause failure of these other services. Finally, the location of decision graphs 221 in network control point data base 2607 means that decision graph 221 is remote from its corresponding service specific code 2619. Consequently, use of a decision graph is a time-consuming operation, close cooperation between service specific code 2619 and a decision graph 221 is not possible, and changes in a service which involve both service-specific code 2619 and decision graph 221 require changes at two separate locations, with the consequent difficulties in coordination and testing.

It is thus an object of the invention to overcome the above difficulties of the prior art and provide improved apparatus and methods for the computer control of devices generally and telephone switching networks in particular.

SUMMARY OF THE INVENTION

In one aspect of the invention, the invention is a system for controlling operations by means of a computer. In the system, a process executing on the computer controls the operations. Included in the data directly accessible by the process is a decision graph which the process traverses during execution and which determines certain of the operations.

In another aspect of the invention, the invention is apparatus for controlling a device by means of a computer to provide a plurality of services employing the device for a plurality of entities. The apparatus includes means for establishing a correspondence between entities and services such that each entity corresponds to only one service, a copy of the complete code required to define the service for each service, and means responsive to an identifier for an entity for causing the computer to execute the copy of the complete code for the service corresponding to the entity specified by the identifier.

Other aspects, objects, and advantages of the present invention will be apparent to those of ordinary skill in the art upon perusal of the following Drawing and Detailed Description.

BRIEF DESCRIPTION OF THE DRAWING

FIG. 10 is a representation of a decision graph used in provisioning;

FIG. 15 is an example of the service logic language used to define a finite state machine for a service;

FIG. 16 is an example of how an action to be taken on traversal of a node can be defined in a finite state machine;

Reference numbers in the figures have two parts: the two least significant digits specify a number within a drawing; the remaining digits specify a drawing number; thus, an item with reference number 201 is first shown in drawing 2.

DETAILED DESCRIPTION

In the following Detailed Description, Applicants will first provide a general overview of their control apparatus and techniques and will then describe how the techniques may be used to control a switch in a telephone system.

Figure 1:
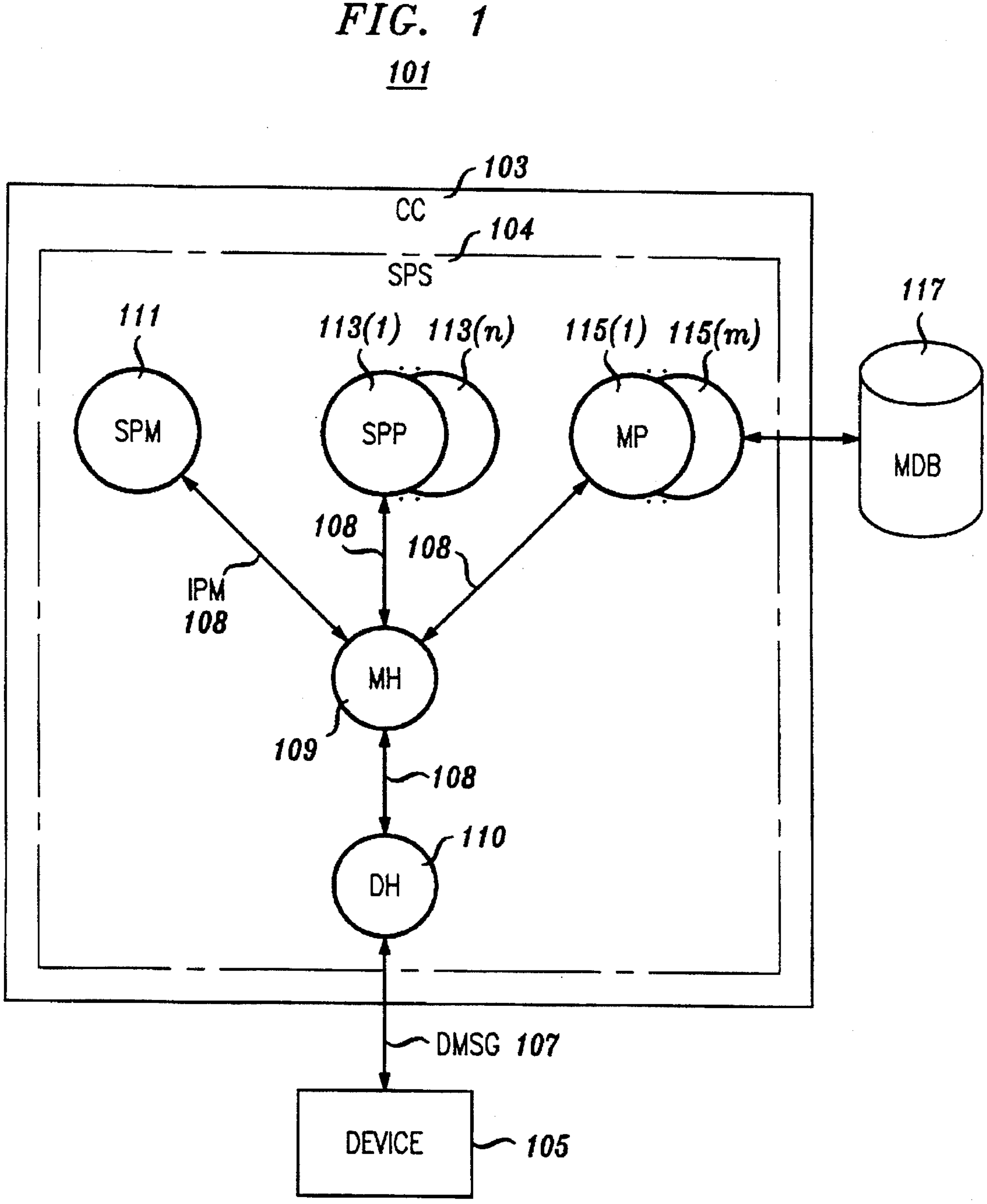
FIG. 1 is an overview of a control system embodying the invention.
Figure 2:
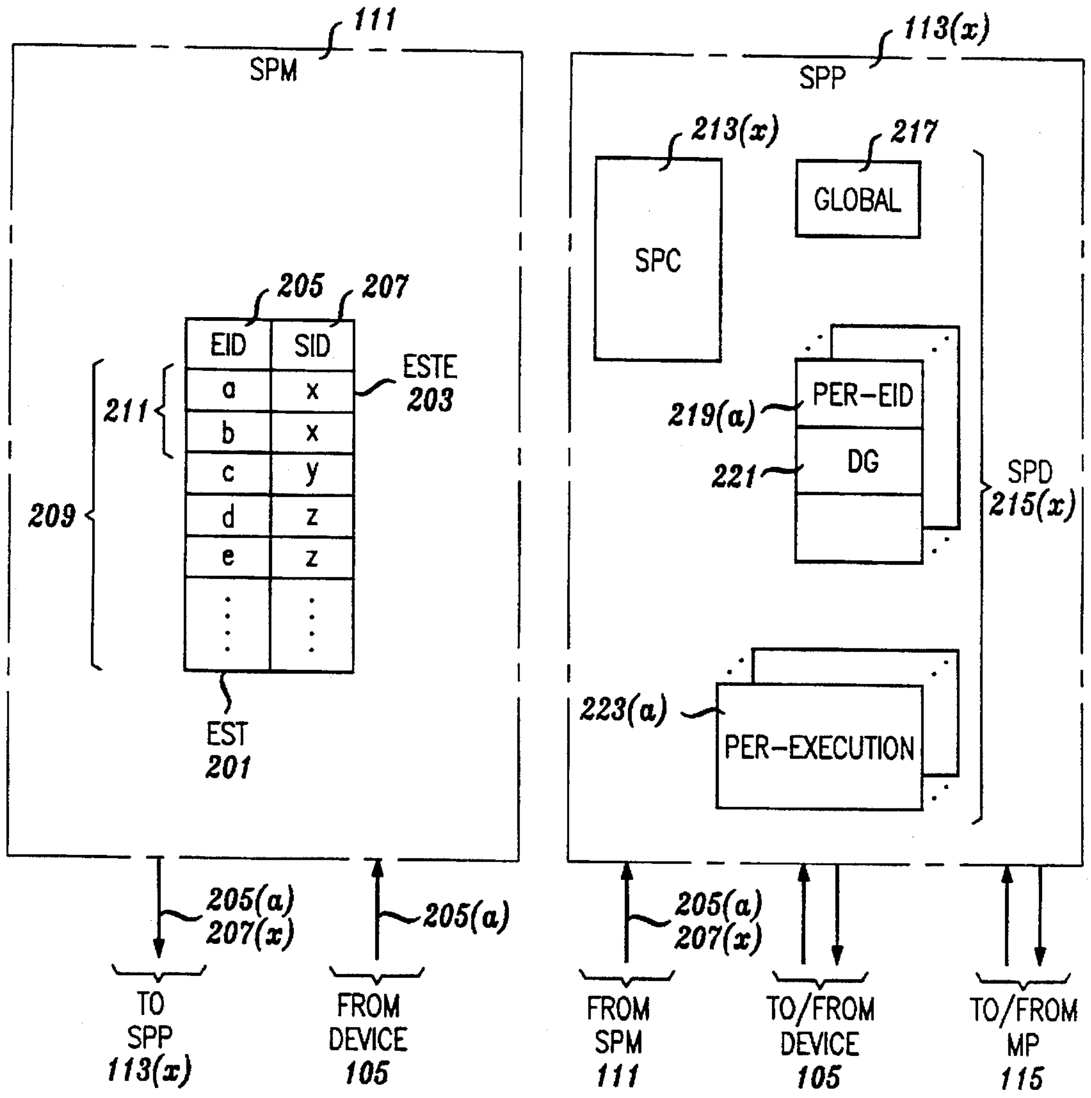
FIG. 2 is an overview of certain data structures in the system of FIG. 1.
Figure 3:
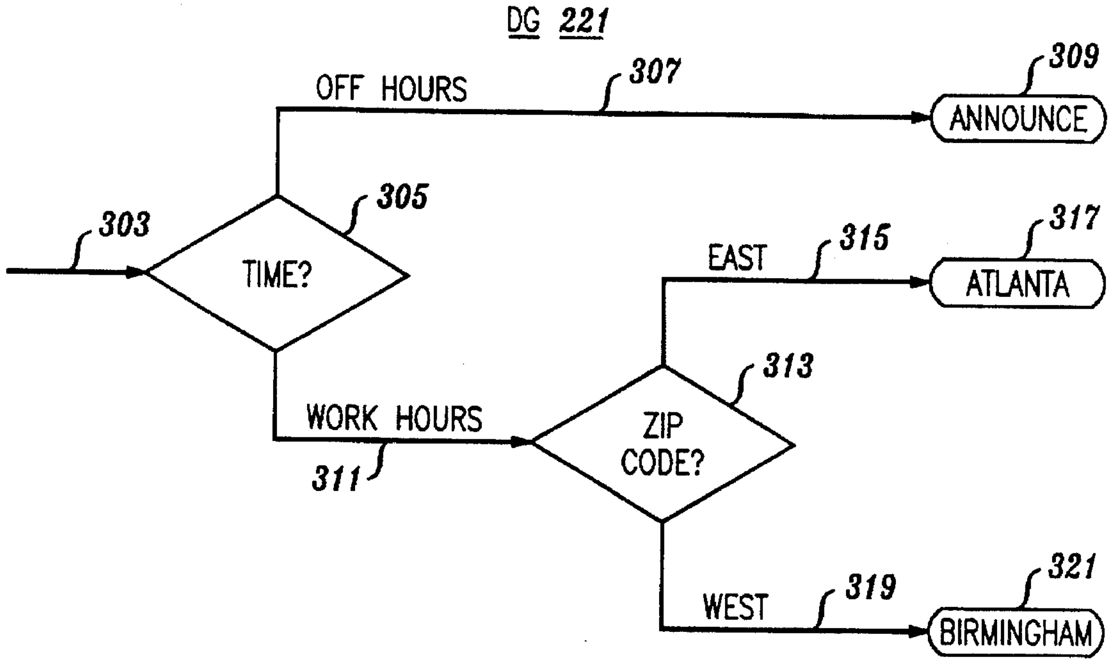
FIG. 3 is a diagram of a decision graph.

Overview of the Control Apparatus: FIGS. 1–3

FIG. 1 provides a high-level overview of the control system 101 apparatus disclosed herein. The control apparatus is employed to control device 105, which may be any device controllable by means of a stored-program computer. The computer which controls the device appears in FIG. 1 as control computer (CC) 103. Control computer 103 may be any type of stored-program computer. Control computer 103 and device 105 interact by means of device messages 107. Device messages 107 in a perferred embodiment fall into two classes: those by means of which device 105 informs control computer 103 of a situation which requires control computer 103's intervention, and those by means of which control computer 103 commands device 105 to perform a function. Messages belonging to the first class are termed event device messages 107 and messages belonging to the second class are termed command device messages 107. Control computer 103 controls device 105 by waiting for an event message from device 105 and then responding to the event message by issuing command messages to device 105 as required to deal with the event specified in the event message. In other embodiments, control computer 103 may not wait for event messages, but may instead periodically read device 105's state. In such an embodiment, device messages 107 may include only command device messages.

When device 105 is performing a service for an entity, the contents of command device messages 107 are determined by service package system 104, a set of processes which execute in control computer 103. In a preferred embodiment, control computer 103 executes the well-known UNIX™ operating system and the processes in service package system 104 are UNIX processes. However, for purposes of the present disclosure, a process may be taken to be any mechanism by means of which a computer system may execute a program for an entity. Thus, in other embodiments, control computer 103 may include a plurality of processors and single ones of the processors may be reserved for execution of single ones of the processes in service package system 104.

The processes in service package system 104 communicate by means of inter-process messages (IPM) 108. As with device messages 107, inter-process messages 108 fall conceptually into two classes: event IPMs 108 and action request IPMs 108. One process sends another process an event IPM 108 when the sending process becomes aware of an asynchronous event which requires that the second process take some kind of action; one process sends another process an action IPM 108 when the performance of the program which the process is currently executing requires that the other process take some kind of action. Routing of messages between the processes of service package system 104 is handled by message handler process 109 in control computer 103.

Operation of device 105 is controlled by device handler 110. Device handler 110 receives inter-process messages 108 from the other processes of service package system 104 and provides the relevant device messages 107 to device 105; similarly, device handier 110 receives messages from device 105 and provides the processes of service package system 104 with inter process messages 108 as required to deal with the conditions indicated by the device messages 107. The processes which execute services are service package processes (SPP) 113. As each service package process executes, it provides messages 108 to itself and other components of service package system 104 and responds to messages 108 from those other components as required to perform the service. In a preferred embodiment, a service package process 113 is always awaiting messages 108 indicating whether an entity requires the service provided by the process 113. When such a message 108 arrives, the service package begins executing the service for the entity, sending and receiving other messages 108 as required by the execution of the service as it does so. In a preferred embodiment, a process 113 may further execute the service for more than one entity at a time.

For example, in a preferred embodiment, device 105 is a switch in a telephone network, and the service performed by a given service package process 113 may be a telephone system service such as 800 number service or caller ID. Messages 108 controlling the switch go from the service package process 113 to device handler 110, and the service package process 113 responds to messages 108 from device handler 110 which indicate the status of the operation performed by the switch. Further, messages to management processes 115 contain billing and usage information required by those processes. Such functions generally require data bases of information, and consequently, management processes 115 read and maintain management data bases 117. The processes in management processes 115 also use inter-process messages to communicate with other processes in service package system 104.

As shown in FIG. 1, each service package process 113 performs only one type of service. Consequently, the services are substantially independent of each other and a service may be added by merely adding an additional service package process 113 and removed by simply removing the service package process 113 corresponding to the service. Each service package process 113 can provide its service for a number of entities using device 105 simultaneously.

System package manager 111, finally, is a process which receives event messages 108 from message handier 109 indicating that an entity requires a service and provides an event message to the proper service package process 113 indicating that the entity requires the service. The service package process 113 responds to the event message 108 by beginning to execute the service for the entity.

Operation of system 101 is as follows: Service package manager 111 receives an event message 108 from message handier 109 which indicates that an entity requires a service. The source of the event message may be either an event IPM 108 from device handier 110 or a message 108 from a management process 115. In the telephone switch embodiment, the event IPM 108 may be the result of a call to a telephone number associated with a service, while the message from management process 115 may have been generated by a debugger being used in a maintenance operation. System package manager 111 responds to the message from message handier 113 by providing a message to service package process 113 which executes the service required by the entity. The message identifies the entity, and service process package 113 executes the service for the entity, providing as it does so messages 108 to device handier 110 which cause device 105 to perform the service and messages 108 to management processes 115 which cause those processes to perform any bookkeeping required for the service.

Modification of services, addition of services, removal of services, and changes in relationships between entities and services are handled by management processes 115. For example, when a new entity wishes to have a service, a process in management processes 115 sends a message 108 to service package manager 111 which indicates the new entity and the service it is to have. Process manager 111 responds to the message by changing its data to indicate that the new entity is to receive the service. Similarly, a process in management processes 115 may send a message to a service package process 113 indicating that the service package process is to execute a new program.

Relating a Service to an Entity: FIG. 2

As indicated above, a service package process 113 executes a service for one or more entities. In service package system 104, the relationship between entities and services is the following: each service package process 113 executes a service for a subset of all of the entities and no entity belongs to more than one subset. Consequently, while a service package process 113 may execute a service for more than one entity, no entity will have more than one service executed for it.

The foregoing relationship between an entity and a service is maintained by means of a table in service package manager 111 called the entity-service table. This table appears in FIG. 2 as EST 201. Entity-service table 201 has an entry (ESTE 203) in it for each entity for which a service package process may execute a service. The entry includes two items of information: entity identifer (EID) 205, a value which uniquely identifies an entity, and service identifier (SID) 207, which identifies the service which service package system 104 causes device 105 to perform for the entity identified by EID 205. As shown in FIG. 2, there is only one ESTE 203 for each entity identifier, but a given SID 207 may appear in more than one ESTE 205. The set 209 of all entities is thus divided into subsets 211 of entities using a given service, and no entity uses more than one service. Consequently, as may be seen from the arrows entering and exiting from service package manager 111 in FIG. 2, when SPM 111 receives a message 108 from message handler 109 which includes an entity identifier and indicates that SPM 111 is to cause a service to be executed for the entity identified by the entity identifier, SPM 111 uses entity-service table 201 to determine which service is required by the entity and sends a message via message handler 109 to the service package process 113 (113(x)) specified in ESTE 203 for the entity. The message contains the service identifier for the service and the entity identifier for the entity.

FIG. 2 also contains an overview of those portions of service package process 113(x) which are required to establish the relationship between an entity and a service. The service executed by service package process 113(x) is specified in service package code (SPC) 213(x). There is a copy of service package code 213 corresponding to each service executed by device 105 and all of the code which defines the service is contained in that service package code, i.e., services do not share copies of code defining portions of the services. SPC 213 is further reentrant, i.e., service package process 113 may execute the code therein for more than one entity entitled to the service at a time. The one-to-one relationship between a service and a copy of its corresponding service package code renders each service substantially independent of any of the others for purposes of modification, and consequently constitutes a fundamental advantage of service package system 104.

There are three general classes of service package data 215 employed by service package process 113 in executing service package code 213. The first class is global data 217. Global data 217 is data of which there is only a single instance in service package process 113 and which is employed in all executions of SPC 213 by service package process 113; examples of such data might be a count of the number of times the service provided by service package process 113 has been used or information about the configuration of device 105 or management processes 108.

Per-entity identifier data 219 is data for which a separate instance exists for each entity entitled to the service. Examples of such data might be a count of the number of times the entity to which the instance belongs has used the service or the rate at which the entity must pay for the service. Finally, there is per-execution data 223, of which an instance is made every time service package process 113 executes service package code 213 for an entity. Per-execution data 223 exists only for the duration of the execution of the code for the entity, and contains all the state necessary for the execution. The effect of per-execution data 223 is to provide each entity for which service package process 113 executes service package code 213 with a light-weight process of its own each time service package process 113 executes code 213 for it.

Figure 4:
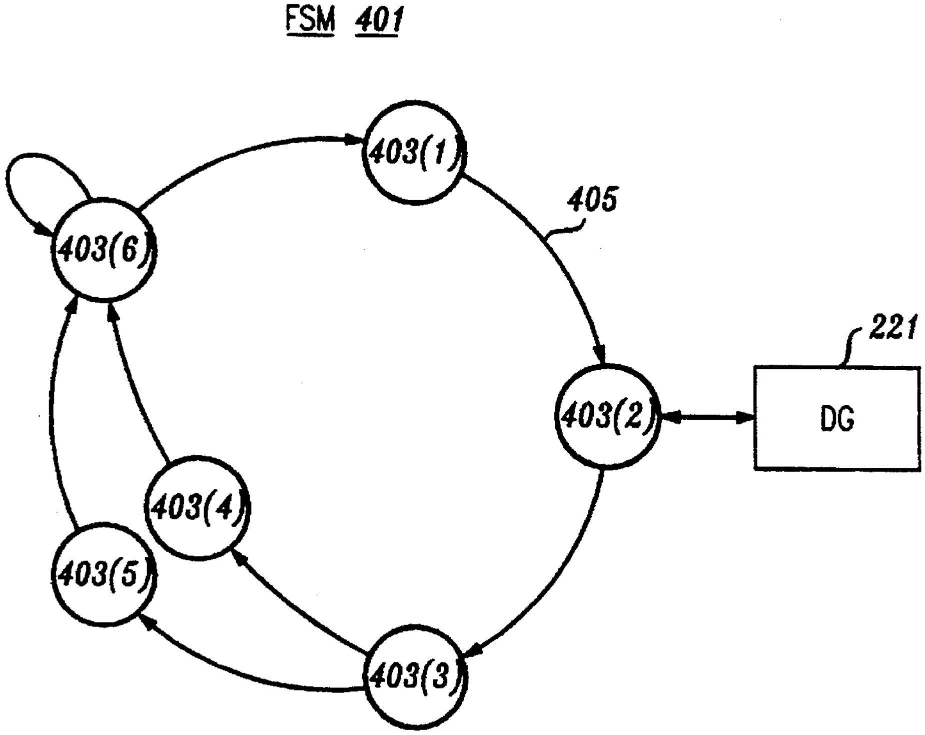
FIG. 4 is a diagram of a finite state machine which traverses a decision graph in one of its states.

Decision Graphs in SPS 104: FIGS. 3 and 4

A special feature of a preferred embodiment of service package system 104 is the inclusion of decision graphs in service package data 215. Decision graphs may be pan of global data 217 or per-entity identifier data 219. In the first case, the same decision graph is used by all entities entitled to the service; in the second case, each entity may have its own decision graph, as shown by decision graph (DG) 221 in per-entity identifier data 219 in FIG. 2. As may be seen from FIG. 3, a decision graph 221 is data which specifies a set of variations in the manner in which the service is executed for a particular entity. The decision graph of FIG. 3 specifies routing of a call to a certain number (the entity for which the service is being executed). Service package process 113 determines how the call is to be routed by traversing decision graph 221, i.e., by beginning at root 303 and following a path through decision graph 221 until it arrives at a leaf (309, 317, or 321) of the decision graph. While traversing a decision graph 221, service package process 113 provides IPM messages 108 to other components as required by decision graph 221. In traversing the decision graph of FIG. 3, service package process 113 first encounters decision block 305, which determines what happens to the call depending on the time at which it is made. If it is made after hours, service package process 113 follows branch 307 to leaf 309, and causes device 105 (in this case, the switch) to make an announcement indicating the business hours. If it is made during business hours, service package process 113 follows branch 311, which leads to another decision block, 313, which determines from the caller's area code what the caller's zip code is. If the zip code indicates that the caller is in an eastern area, service package process 113 follows branch 315 to leaf 317, and causes the switch to connect the caller to a number in Atlanta; if the zip code indicates that the caller is in a western area, service package process 113 follows branch 319 to leaf 321 and causes the switch to connect the caller to a number in Birmingham.

As can be seen from the foregoing, the inclusion of decision graph 221 in per-entity identifier data 219 makes it possible to specifically tailor a general service for each of the entities which use it. Further, since decision graph 221 is part of data 215, rather than code 213, a decision graph 221 for a given entity may be modified whenever service package process 113 is not actually executing code 213 for the entity whose decision graph 221 is being modified. Modification of decision graph 221 for an entity is carded out by a process in management processes 115 which sends a message 108 to service package process 113 indicating the new decision graph which service package process 113 is to use when executing for the entity to which per-EID data 219 belongs.

The flexibility provided by decision graphs 221 in a preferred embodiment is further increased by the fact that the decision graphs 221 employed in the preferred embodiment may include nodes which specify actions which are defined in service package code 213 for the service. The traversal of such a node by service package process 113 results in service package process 113 sending an inter process event message 108 to itself. On receipt of the event message 108, service package process 113 reacts as it does to any other event message addressed to it, namely, it executes code in service package code 213 for the event. In this case, the execution of the code causes performance of the action which is to result from the traversal of the node.

A further refinement of the manner in which decision graphs 221 are employed in a service package process 113 is shown in FIG. 4. As shown there, in a preferred embodiment, service package code 213 implements a finite state machine, i.e., a machine which has a fixed and finite number of states and in which transitions from one state to another are defined by transition rules. Such a finite state machine (FSM) 401 is shown in FIG. 4. Each state 403 is indicated by a circle; arrows connecting the states indicate allowed transitions. Thus, the only transition from state 403(1) is to state 403(2), while two transitions are possible from state 403(3), namely, to states 403(4) or 403(5). As indicated by the arrow looping back to state 403(6), a transition may also return to the state in which it began. In the preferred embodiment, service package process 113 executes the finite state machine 401 defined by service package code 213 for each entity which uses the package. Each finite state machine has the form of a loop, and when service package process 113 is not executing the service for the entity, it remains in an idle state awaiting messages 108. In the finite state machines 401 of the preferred embodiment, a node 403 may have dependent decision graphs 221. When service package process 113 enters such a node, for example, node 403(2) in FIG. 4, it traverses the decision graph 221 for the entity for which it is executing service package code 213. An advantage of the arrangement shown in FIG. 4 is that the effects of decision graph 221 are confined to state 403(2) of finite state machine 401, and consequently, the arrangement provides both flexibility, in that the behavior of finite state machine 401 when it is executed for an entity may be altered by changing the decision graph 221 for the entity, and security, in that changing the decision graph does not affect the other states or the transitions between the states.

Figure 5:
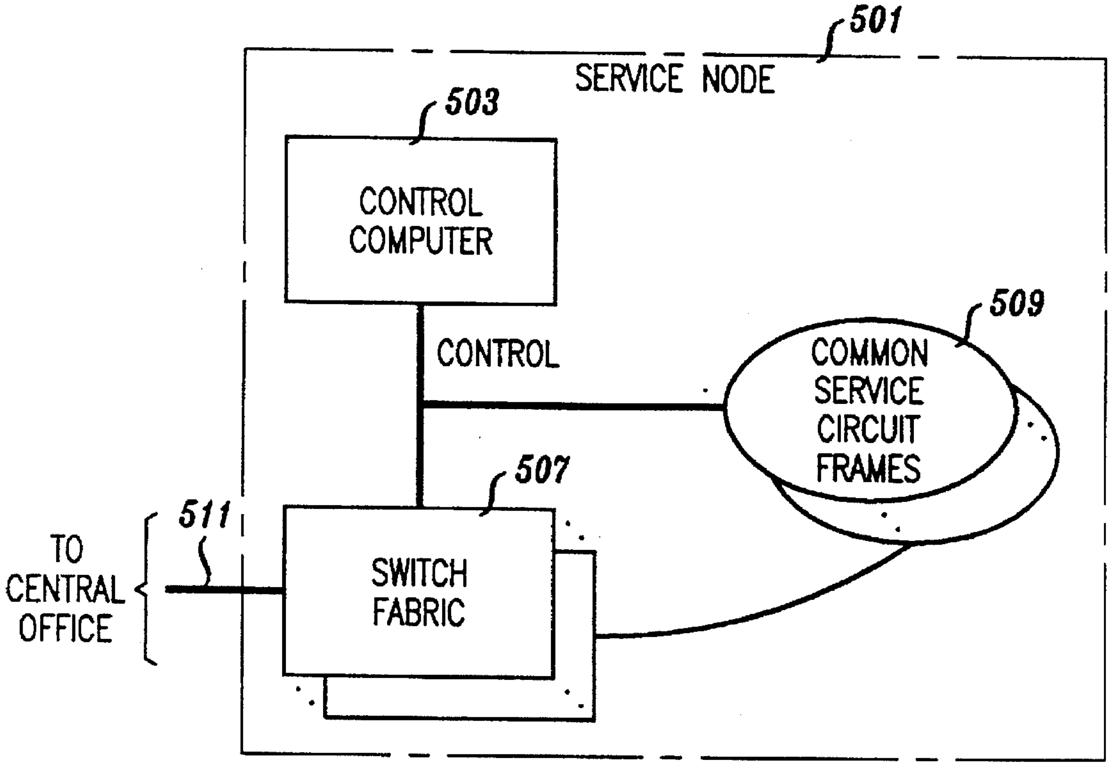
FIG. 5 is a diagram of a service node in a telephone system in which the invention is embodied.
Figure 6:
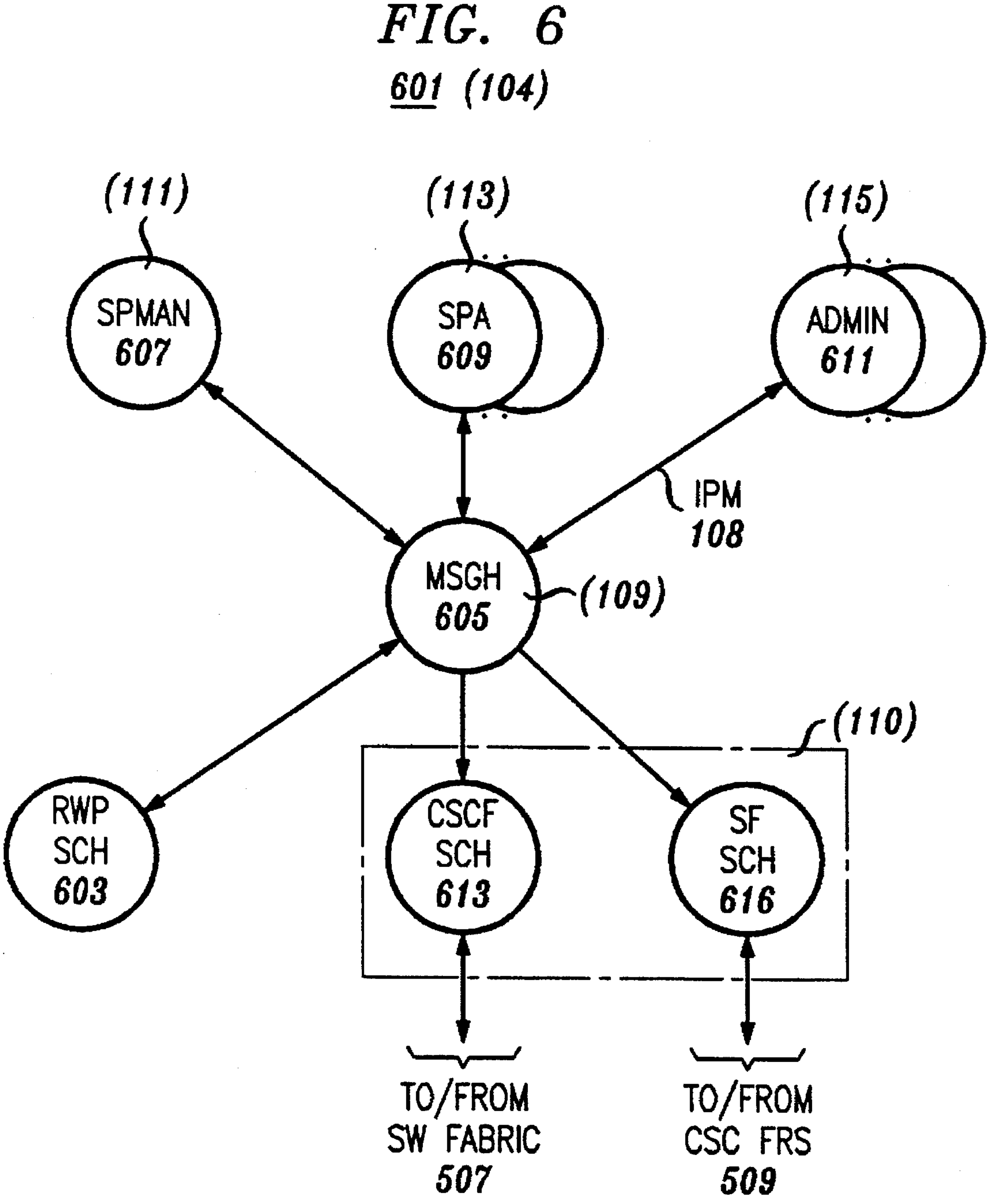
FIG. 6 is an overview of the control system for executing services in the service node of FIG. 5.

Embodiment of Service Package System 104 in a Switching System: FIGS. 5 and 6

A preferred embodiment of service package system 104 is used to provide services to entities using a switching node in a telephone system. A node which can provide such services is termed a service node. FIG. 5 shows such a service node 501. The components of service node 501 are switch fabric 507, which routes incoming calls to their destinations, common service circuit flames 509 which provide services such as voice prompts and collection of data input by callers, and control computer 503 which controls the operation of switch fabric 507 and common service circuit frames 509. Control computer 503 thus corresponds to control computer 103 of FIG. 1 and switch fabric 507 and common service circuit frames 501 together correspond to device 105. Service node 501 is further connected via line 511 to the central office of the telephone company to which node 501 belongs. Line 511 permits remote monitoring and maintenance of service node 501.

FIG. 6 is an overview of some of the processes which execute in control computer 501. System 601 corresponds to service package system 104 of FIG. 1. In general in FIG. 6, portions of FIG. 6 which correspond to portions of FIG. 1 are labelled with the number of the corresponding portion of FIG. 1 in parentheses. As in FIG. 1, the processes communicate by means of inter process messages 108, which are carded by message handier (MSGH) 605. As in system 104, there are two types of messages 108: action messages and event messages. SPMAN 607 corresponds to SPM 111; like SPM 111, it maintains a table which relates entity identifiers to services; in the preferred embodiment, however, entity-service table 201 in SPMAN 607 is in memory in control computer 503 which is accessible to processes in system 601 other than SPMAN 607, making it possible for those processes to determine the service corresponding to an entity identifier without sending a message to SPMAN 607.

Service package applications 609 correspond to service package processes 113 of FIG. 1. In this embodiment, they provide telephone services such as 800 number service, locator service, calling number announcement service, or telephone voting to subscribers to the service. When a subscriber subscribes to the service, he is given a telephone number, and that telephone number serves as entity identifier 205 for the service.

Administrative (ADMIN) processes 611 correspond to management processes 115, and perform management and maintenance functions for the services. The functions include the following in a preferred embodiment:

User System Language Interface (USLI)—The USLI allows maintenance personnel to perform OA&M (operations, administration, and maintenance) actions on SN 501 using a User System Language (USL) interface. The USLI also supports the Primary Maintenance, Control & Display, Critical Indicators, and Emergency Action Interface channels for both the local and remote maintenance centers. In addition, the USLI manages the interface between the Control Computer and the Alarm Relay Unit (ARU).

AMATP Interface (AMATPI)—The AMATPI provides the interface between the platform and an AMA (automatic host accounting) host collector (HOC). AMATPI responds to HOC queries for AMA billing data and handles all the functions necessary to transfer AMA records from disk storage to the HOC over an AMATP connection.

EADAS Interface (EADASI)—The EADASI provides the interface between the platform and an EADAS system. EADASI performs all necessary functions to transfer measurements data between SN 501 and an EADAS system over a BX.25 link.

Customer Interface (CUSTI)—CUSTI provides the necessary security and command interface required for limited subscriber access to appropriate service and subscriber-specific data.

Billing (BILL)—The Billing process (BILL) collects billing records generated by executions of services. BILL also generates primary tracer records included in the billing data stored to disk. BILL handles AMA and, other billing records.

Recent Change/Provisioning Database (DB)—The DB subsystem is the repository for all recent change and provisioning data. It is also responsible for notifying the proper process when an update to the database may affect that process.

Scheduler (SCHED)—SCHED is responsible for scheduling processes to run at regular intervals (e.g. diagnostic and audit processes).

Measurements (MEAS)—The MEAS process receives measurements from the rest of the system, perform measurements thresholding, and produces reports.

Initialization (INIT)—The Initialization process (INIT) controls process initialization during all levels of system initialization and monitors system sanity while SN 105 is active.

ADELOAD—ADELOAD is responsible for downloading all of the necessary files from the Application Development Environment (ADE) to load new service and device handier applications onto SN 105.

The remaining three processes, 603, 613, and 614, are service circuit handler (SCH) processes. These processes correspond to device handler 110 in FIG. 1. In the presently-preferred embodiment, CSCF SCH 613 controls common service circuit frames 509, while SF SCH 615 controls switch fabric 507. RWP SCH 603 is a process which implements "reverse white pages", i.e., a function which, when given a telephone number returns information about the number's subscriber. In the presently-preferred embodiment, the reverse white pages are implemented in software, but in other embodiments, they may be implemented in special hardware.

Operation of service node 501 is as follows: As mentioned above, telephone numbers serve as unique identifiers for entities subscribing to services provided by service node 501. When switch fabric 507 receives a call, it provides the called telephone number and the calling telephone number to switch fabric SCH 615, which in turn uses the called telephone number as an entity identifer in entity-service table 201. Switch fabric SCH 615 then sends an event message 108 containing the calling number and the called number to service package application 609 for the called number. That service package application 609 responds to the event message by beginning an execution of the service for the called number. In the course of the execution, service package application 609 sends messages to the SCH processes and to the ADMIN processes 611 as required to carry out the services and perform billing and data recording functions. Maintenance of service node 501 is performed in the same fashion, except that the maintenance operation is performed by one of the ADMIN 611 processes, which sends messages 108 to the other processes as required to perform the maintenance function.

Figure 7:
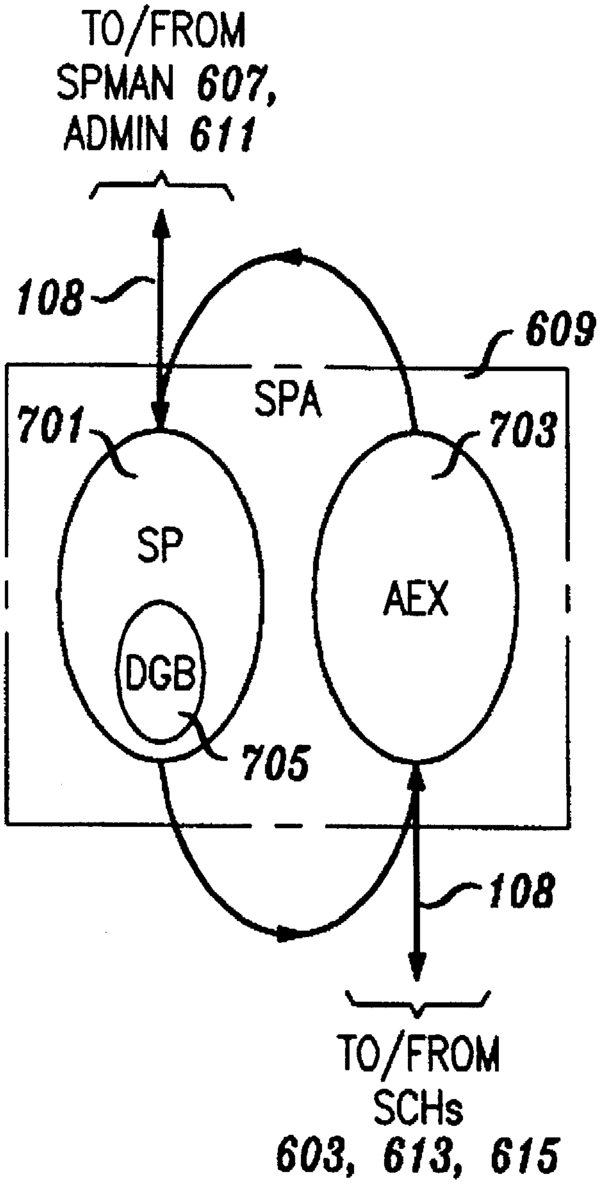
FIG. 7 is an overview of the processes which execute a service in the service node of FIG. 5.

Components of SPA 609: FIG. 7

In a preferred embodiment, SPA 609 is implemented by means of two processes for each service. As is the case with the other processes in system 601, the processes communicate with each other and other non-SPA processes in system 601 by means of messages 108. The two processes of SPA 609 divide the functions of SPA 609 according to the source and destinations of the messages they receive and provide. Application execution (AEX) process 703 receives messages from and provides them to the SCH processes 603, 613, and 615 and additionally receives messages from and provides them to its corresponding service process 701. Service process 701 receives messages from and provides them to SPMAN process 607 and ADMIN processes 611, as well as providing them to and receiving them from AEX 703. A subcomponent of SP process 701 which will be examined in more detail later is decision graph builder (DGB) 705, which builds the decision graphs 221 traversed by service process 701. As may be seen from the foregoing, AEX process 703 effectively handles the interface to the hardware devices, while service package process handles the interact to the other processes. In other embodiments, SP process 701 and AEX process 703 may be combined into a single process, or there may be a single AEX process 703 which serves the SP processes 701 for all services available on system 601. However, in all cases, there will be a one-to-one relationship between a service and a copy of the code defining the service, and the processes will execute the copy of the code corresponding to the service.

SPA Data: FIGS. 8–11

Figure 8:
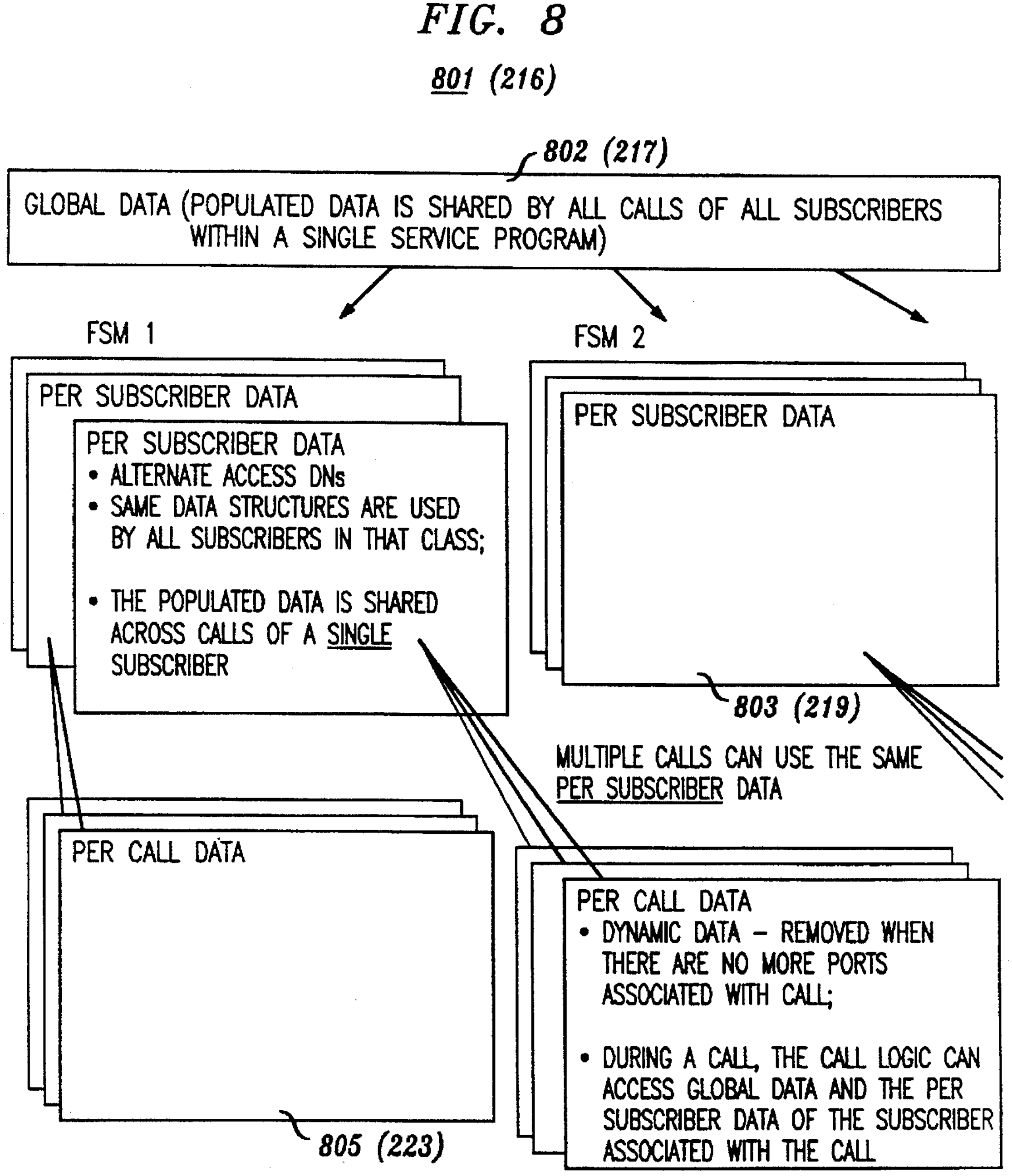
FIG. 8 is an overview of the data employed in executing a service.

FIG. 8 shows the data used in executing a service in response to a call in SPA 609. This data corresponds to service package data 215, and like that data, has parts (802) which are global to all executions of the service, parts (803) which are per-subscriber (i.e., per each of the telephone numbers which are entitled to the service), and parts which are per-individual call (805). Correspondences to FIG. 2 are indicated by the numbers in parentheses. Global data 802 is available to any call being served by SPA 609; per-subscriber data 803 is available to any call for that subscriber being served by SPA 609 and includes any per-subscriber decision graphs 121; per-call data contains the state of a current call to the service provided by the subscriber. Per-call data is available only to the current call and is removed at the end of the call.

Figure 9:
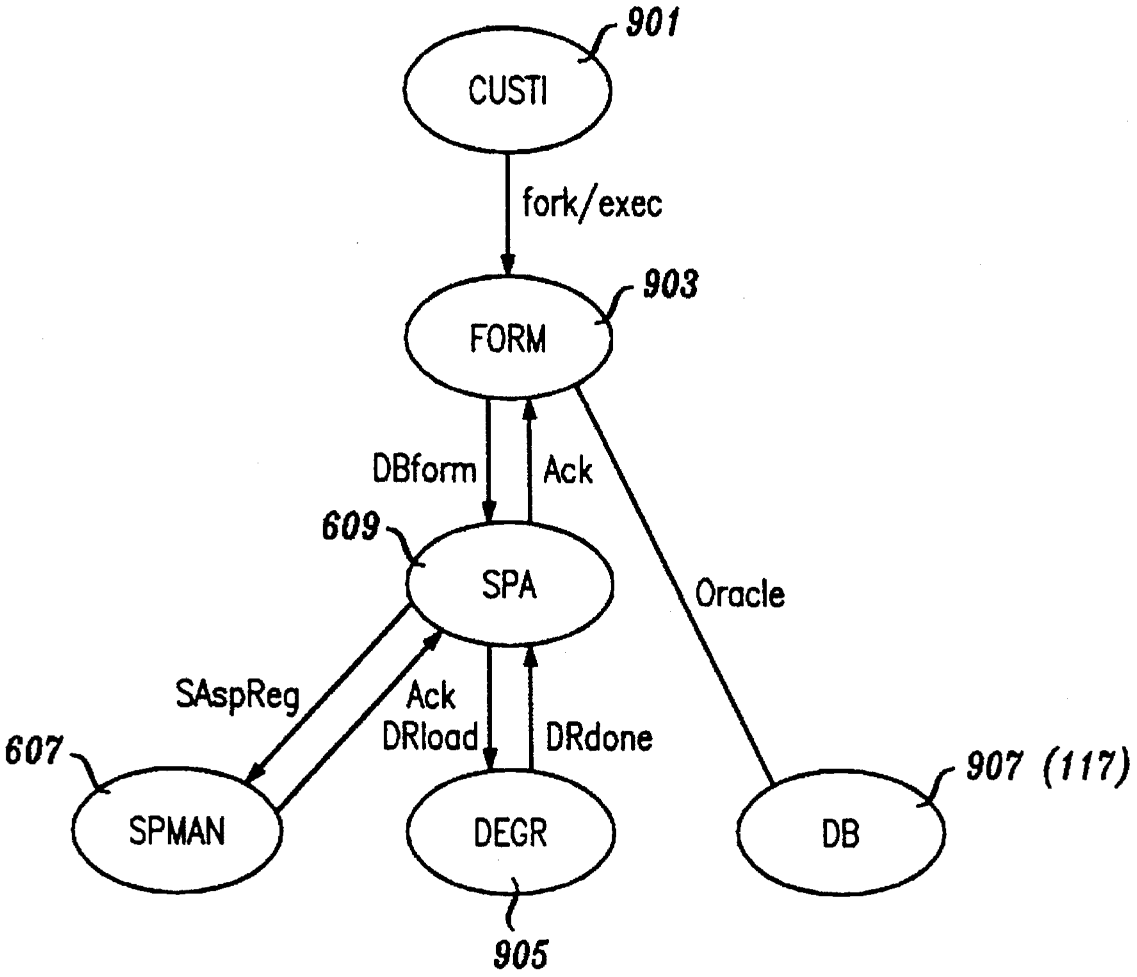
FIG. 9 is a flowchart showing how a service is provisioned in the service node of FIG. 5.

SPA Data 801 is subject to frequent change. Subscribers may be added to or deleted from a service, the rate a subscriber is paying for a service may change, new decision graphs may be required, and so forth. Modification of SPA data 801 for a service while the service continues to function is termed provisioning the service. In service node 501, provisioning is performed by two of administration processes 611, Customer Interface (CUSTI), for non-decision graph data, and Decision graph interface (DEGR). FIG. 9 shows how these processes employ messages 108 to perform the provisioning. Customer interface (CUSTI) 901 permits an employee of the telephone company to which service node 501 belongs to provision a service package from a terminal connected to service node 501.

CUSTI 901 begins by forking to produce a child process, FORM 903, which displays a form for the data to be added on the terminal. The employee then fills in the form, and FORM process 903 provides the data in the form to SPA 609, which updates per-subscriber data 803 or global data 802 as required. If an update of entity-service table 201 in SPMAN 607 is also required, that is taken care of by messages between SPA 609 and SPMAN 607. FORM process 903 also provides the data to a data base process 907 of administration processes 611, and data base process 907 stores the data in a data base available to service node 501. Storage in the data base assures that the data can be reloaded into service node 501 if there is a failure in control computer 503 and also makes the data available for telephone company record keeping.

DEGR 905 interacts with decision graph builder component 705 of service process 701 to provide a decision graph 221 for a subscriber to the service executed by service process 701. Decision graph 221 in a preferred embodiment is defined by an application programmer using a graphical DG Editor to "paint" a DG that consists of nodes (e.g. time-of-day nodes, day-of-week nodes, connection nodes, announcement nodes, etc.) that are interconnected based on the flexible logic intended by the DG programmer. The DG Editor generates a DG Description File 1001 (ASCII text) that describes the DG's characteristics. The associated DG Compiler reads the DG Description File, determines whether the DG complies with all of the rules associated with DGs in general and the selected nodes in particular, and then if the DG is valid, prepares a DG Definition File (ASCII text) that provides all of the information that is needed by the DGB to create the decision graph 221.

FIG. 10 shows the contents of the DG definition file. As the figure suggests, the definition file includes information that defines each of the DG's Nodes and each of its Tables with one Node or Table defined on each file line. Within the DG Definition File, a Node's definition includes +the node's type (each type has a unique name such as root, connect, time), +the node's identity (a unique integer is assigned to each node), +the node's parent (with the exception of the root node, the identity of that node's parent node), +the number of branches that have been assigned to the node (an integer), +the child associated with each branch (identity of the node at the other end of the branch), +the number of private traversal data members used (see note below regarding private traversal data), and +the contents of the individual private traversal data members.

The private traversal data is all of the information which is required when a node of the decision graph 221 is travered.

Each table is described by a file line that contains the argument and value pairs that make up the table. In general, a table must be defined before it can be used in the definition of a table node.

Once the DG's Definition File is prepared, the DG can be instantiated within a Service Package. As noted in the brief requirement description above, DG instantiation can occur as a result of initialization of service process 701, subscriber initialization or subscriber recent change activity (the latter may be recent change activity on the part of the network provider or on the part of the subscriber). When an SP 701 is being initialized, it uses a DBselect message 108 to determine what data must be loaded into the SPP; the response to this request will identify the names of all DG Description Files that are associated with the SP 701's DGs. If a new subscriber is being added to an existing SP 701, the names of the DG Description Files are sent to the SP 701 via a DBformlnsert message, and if an existing subscriber's data is changed (the flexible logic associated with a DG changes), the identity of the DG's Description File is provided through a DBformUpdate message.

After it receives the name of a DG Description File, SP 701 creates an instance of a C++ DecisionGraph Class. Decision Graphs are instances of the class Decision Graph. Each such instance includes a set of node objects (one object per node), and it provides methods for building and traversing the DG. In effect, DGs are "smart" data objects. DGs are can be created for each DG variable declared within the service package code executed by an SP 701. Because an application programmer can associate such variables with individual subscribers or associate them with all users of the service, the DGs that are created through the DGI can be assigned to individuals or groups of individuals.

Once SP 701 has created an instance of DG, it can instruct the DG to "build" itself by invoking the DG's build function. The inputs to the build function are the name of the DG's Description File and a dictionary of valid node types (the contents of this dictionary are based on the application programmer's declaration of valid nodes for the DG variable being defined.) The build function stores this information and the current date and time in the DG class member for future use.

Figure 11:
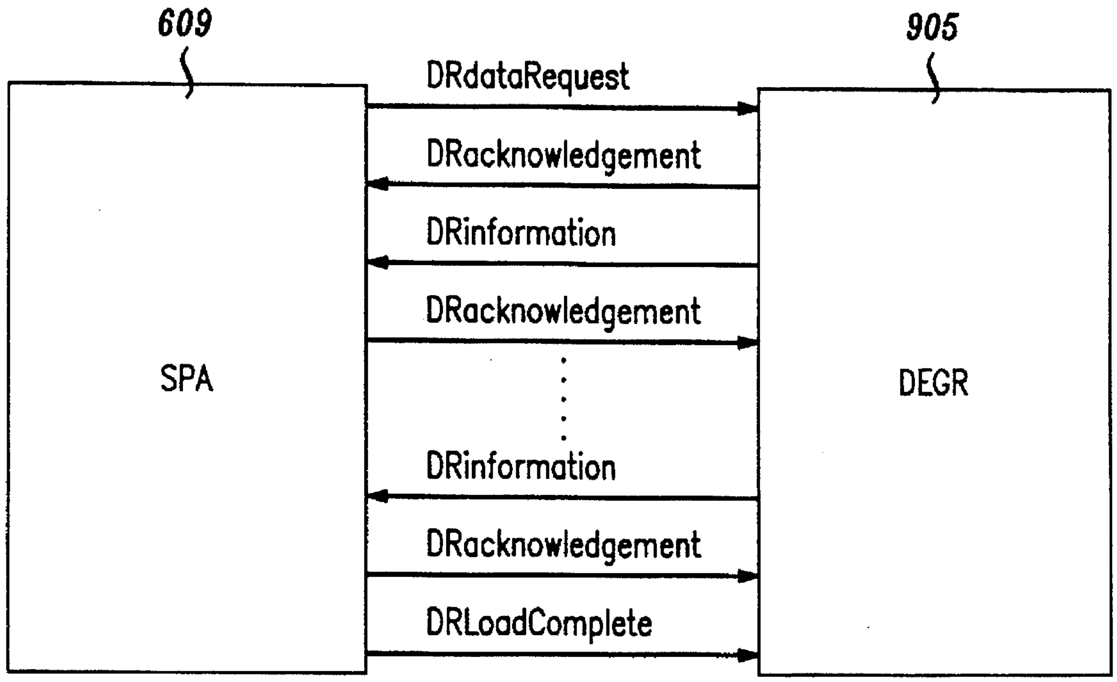
FIG. 11 is a diagram showing how a decision graph is added to a service's data.

The construction of a DG requires communications between SP 210's decision graph builder 705 and DEGR process 905. FIG. 11 shows these communications. DGB 705 software employs a simple finite-state machine algorithm to progressively build up a DG by iteratively requesting DG information from DEGR process 905 and then processing it on delivery. Within this context, the actions are the requests for node data sent from DG BUILD 705 to DEGR process 905, and the events are the node definitions that are returned from DEGR 905 to DG BUILD 705. Communications between DG BUILD 705 and DEGR 905 are of course by means of messages that are delivered through MSGH 605.

Traversal of DGs 221 by Service Process 701

In a preferred embodiment, service process 701 executes a finite state machine in which certain states of the finite state machine may traverse decision graphs 221. Decision graphs 221 in the preferred embodiment are implemented as a class of the C++ object programming language. Included in the definition of the decision graph class is a traversal method. Required inputs to the traversal method include the call data object 1203 (shown in FIG. 12 infra), which is a part of per-tail data 805. Call data object 1203 for a call contains all of the run-time (dynamic) data that is associated with the call. It also contains data members that are specific to the traversal of the decision graph 221 service process 701 is currently traversing for the call. These members include currentNode, indicating the node of decision graph 221 being traversed, and traverseState, indicating the current state of the traversal. When the traversal method is invoked by SP 701, the value of currentNode must be set to DR_ROOTNODE since all traversals must start there (DR_ROOTNODE is the identity of the DG's root node and it's value is always assigned 0) and the value of traverseState is set to DR_INITIAL_STATE.

The traversal method is implemented as a finite-state machine that iteratively asks each member node, beginning with DG 221's root node, to traverse itself and return the identity of the node (child) to which control is next to be passed. The traversal (or execution) of a member node depends on the type of node that is encountered.

Decision nodes (nodes which select a child based on the current value of some dynamic variable(s)) provide software that examines the value of the affected variables and selects the appropriate branch and child to which control is to be passed. The child's identity is placed in the currentNode data member, and the traverseState is set to DR_CONTINUE. The node then returns control to the traversal method, which notes that the traverseState implies an immediate continuation and so it calls a method provided by the class for traversing a node of the type of currentNode. Some of the node types are predefined; the methods for these nodes are provided as pan of the system software for system 601. Hence, the selection of a child is done immediately, and the decision can make use of any data available in calldata object 1203 for the call.

Nodes that are user-defined require that the logic provided for selecting the child be defined as part of the finite state machine executed by service process 701. The node traversal method for user-defined decision nodes therefore cause service process 701 to send an event request to itself. The event request specifies a user-defined event handier which service process 701 executes in one of the states of its finite state machine. The event handler must select a child and the traversal method continues traversal with the selected child. Because the event handier is executed by SP 701, it has access to SP 701's global, per-subscriber, and per-call data.

Traversal of a leaf node of a decision graph 221 by SP 701 always generates an event message 108 to SP 701. Decision Graphs do not under any circumstances send messages 108 to processes other than SP 701. It is in the discretion of SP 701 to determine which event messages 108 to honor, when to honor those event messages 108, and in what way to honor them. Once the traversal method for a leaf node has requested an action, it specifies that there is no next node (in effect that the traversal has been completed) by setting the traverseState to DR_DONE and then it returns control to the graph traversal method. The graph traversal method notes that the traverseState indicates completion, and so it generates a completion message (traverseSucceeded event) and sends it to SP 701.

Action nodes are of two types, local and external. Local action nodes are nodes that are permitted to change the values assigned to data available to the DG.

Local action nodes differ from decision nodes only in that they do not choose among different children; instead they have exactly one child to which control will be given once the data values have been set.

External action nodes are similar to terminating nodes in that they send SP 701 an event message requesting a specific action; they differ from a terminating node in that they are designed to continue the traversal (e.g., selecting a child) after the action has been carded out by SP 701. External action nodes indicate the need to continue traversal by setting the traverseState to DR_WAITING and returning control to the graph traversal method, which itself returns. In this case, the traversal of decision graph 221 can be continued after SP 701 has responded to the event message 108 and completed whatever action was requested in the event message.

To continue the traversal, SP 701 specifies what node is to be traversed next and may also set data values used during the traversal of that node. Then SP 701 invokes the traverseContinue method defined for the decision graph class. When this method is invoked, it checks the current value of traverseState (it must be continue) and the value of currentNode. It selects the node specified and invokes that node's traverseContinue method. It is now possible for the node to complete its work, select a child, set the traverseState to DR_CONTINUE, and return control to the graph traversal method.

Note that SP 701 is not required to continue the traversal of a DG 221 that has sent an event message to SP 701. It is left to the design of the finit state machine executed by SP 701 to make such a determination. The methods defined for the decision graph C++ class are fully capable of dealing with a traversal that is discontinued after an external action node has sent an action request to SP 701.

It is always possible, of course, for a DG traversal to fail. If a node decides that a traversal should be discontinued, it sets the traverseState to DR_FAILED. The graph traversal method detects this failure, and it sends an appropriate failure code (traverseFailed event) back to SP 701.

While a DG 221 is being traversed, control between nodes is always returned to the graph traversal method. Therefore, this method can and does keep track of how many nodes are processed, what kind of nodes, and which ones. This information is recorded and can be made available for measurements and billing. If this is done, this trace information will be saved in a traceRecord data member in the call data object for the call. Moreover, if the graph traversal method detects that too many nodes are being traversed (e.g., more than 100), then traversal will be terminated. It will be up to the programmer defining the state machine executed by SP 701 to select a node count if the default is considered inappropriate.

Figure 12:
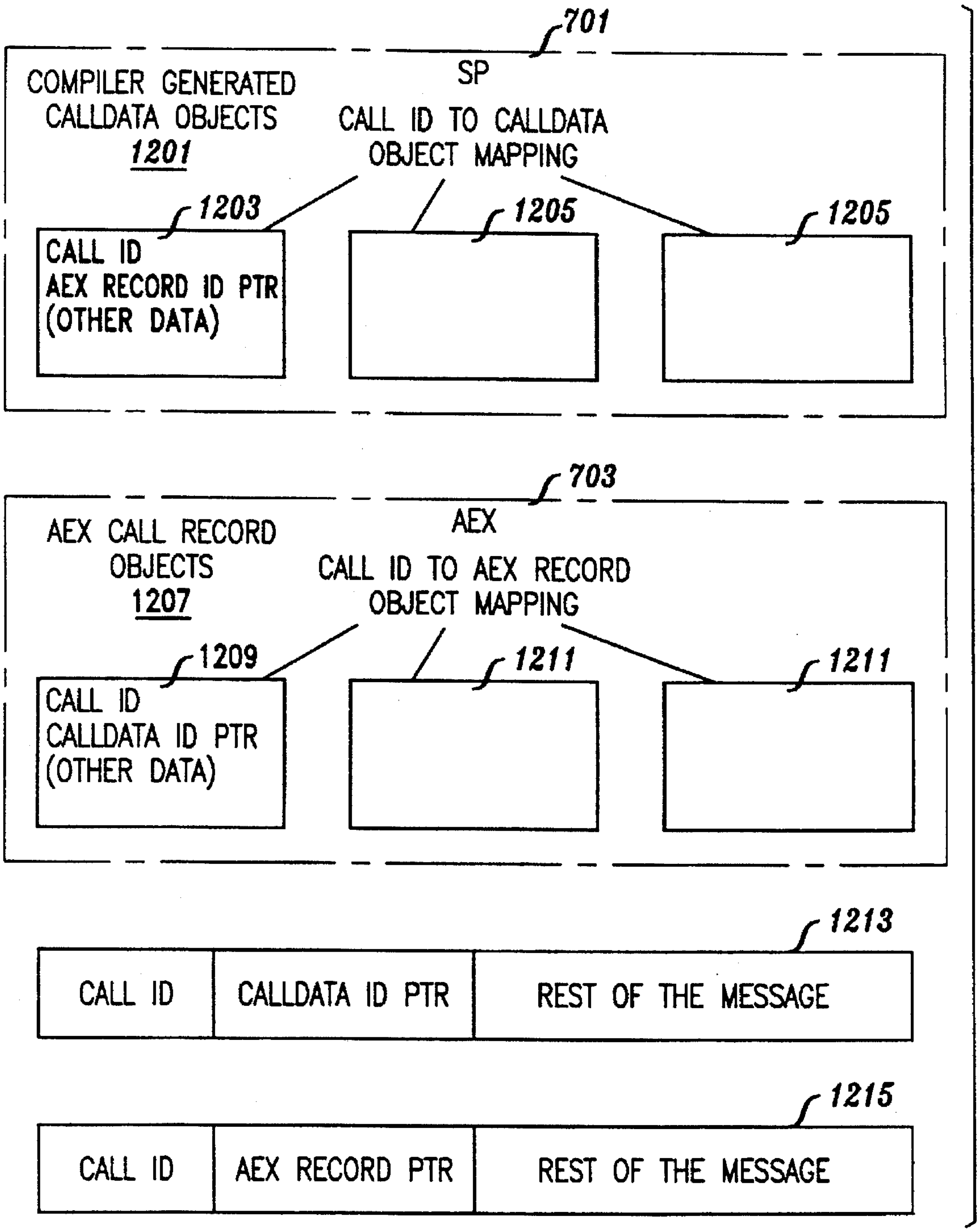
FIG. 12 is a diagram showing how the processes which execute a service interact.
Figure 13:
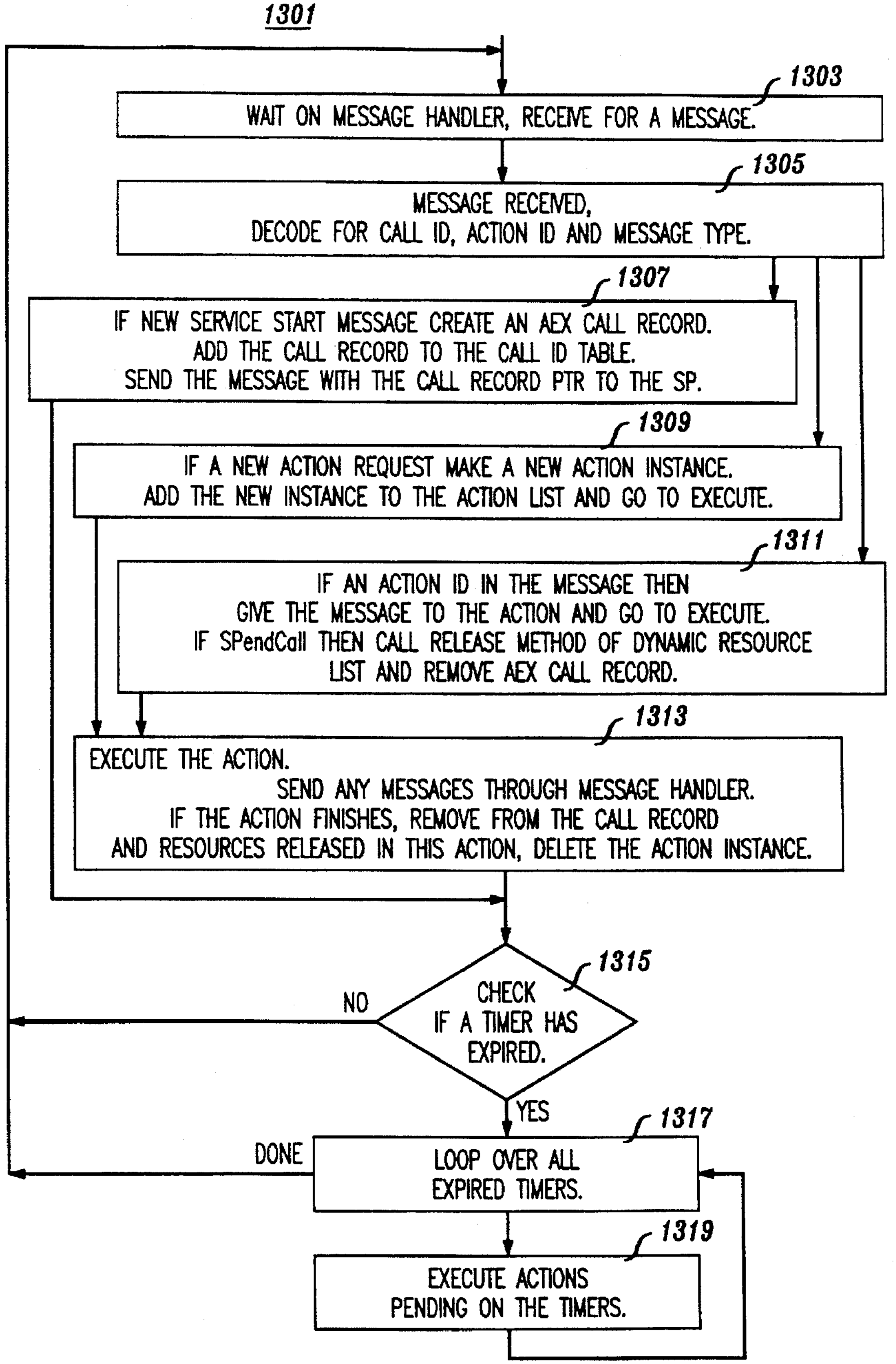
FIG. 13 is a flowchart showing how the AEX process operates.

Interactions between AEX 703 and SP 701: FIGS. 12 and 13

Coordination between AEX 703 and SP 701 is achieved by means of the data structures and message 108 contents shown in FIG. 12. The data structures are components of per-call data 805. In service process 701, there is a call data object 1203 for each current call. The call data object contains at least the call identifier (usually the telephone number) for the service subscriber and an identifier for a corresponding call record used by AEX 703. SP 701 locates call data objects 1203 by means of tables 1205, which map the call identifier to the call data object. The data structures 1207 in AEX 703 are similar, except that AEX call record object 1209 contains a pointer to the corresponding call data object 1209. Again, there are tables 1211 permitting location of the call record object corresponding to a call identifier.

As may be seen from message formats 1213, each message from AEX 703 which responds to an action request to AEX 703 from SP 701 contains the call identifier and the pointer to the call data object in SP 701 for the call; similarly, each message from SP 701 to AEX 703 requesting an action includes the call identifier and a pointer to the AEX call record 1209 for the call.

AEX 703's main processing loop is detailed in FIG. 13. The loop appears as loop 1301 in that Figure. As shown in box 1303, AEX 703 waits for messages 108 from other processes in system 601.

There are five main types of messages received by the AEX: service start messages from SF SCH 615 (or in other embodiments from a process in ADMIN 611 or SP 701), action request messages from SP 701, SCH message responses from message requests that the AEX has previously sent to the SCH processes, call related messages from the SCH processes, and timer messages. When AEX 703 receives a message 108, it decodes it into one of these main categories as shown in block 1305 and then proceeds.

If the message 108 is a service start message (i.e. "LIterminatingCall"), from SR SCH 615, AEX 703 creates an AEX call record object 1209, as shown in block 1307. It adds the call id and the new call record to call id table 1211. AEX 703 then sends a SPterminatingCall" or "SPorginatingCall" message 108 to SP 701, depending on which one is required. AEX 703 puts the AEX call record pointer in this message, so that subsequent action requests can be added to the call record.

As shown in block 1309, if the message is an action request, AEX 703 creates an action data object. The AEX "actionid" is the pointer to the action object, and the "actionid" is passed as a field in all action messages 108 to the SCHs, and must be sent in all responses from the SCHs to AEX 703. The action object is added to AEX call record object 1209 for the call. AEX 703 then executes the action object by calling its "start" method. The action then can send messages to SCH processes through MSGH 605 and wait for responses.

If the message is a response message from an action that is ongoing, AEX 703 decodes the "actionid" from the message and uses it to directly call the "processmessage" method of the action object, as shown in block 1311. The action then processes the message and sends any required requests to the SCH processes, as shown in block 1313. If this is the last response required by the action, the action is removed from AEX call record data object 1209 for the call, and the action sends SP 701 an action response message. Once the action response message has been sent the action is deleted.

If the message is a call related message such as a "LIhangup" AEX 703 decodes this message and sends a response to SP 701. If the message has a valid actionid in it, AEX 703 also sends the message to the action as described above.

As blocks 1315 through 1319 indicate, if a timer has expired during the message processing cycle, the timers in the timer list that have expired are set to an expired state in the signal handier. The signal handler then checks to see if the process is waiting on the message queue. If the process is waiting on the message queue the signal handier calls the AEX timer method to process the expired timers immediately, otherwise the signal handler sets the expired timer flag. The signal handler then returns. When the message that is being currently processed is finished the timer flag is tested. If a timer has expired, the actions that are pending on that timer are all executed before any more messages are processed. The timeout entry for the action is called with a timeout message argument. The action processes the time out using any data in the message that it requires. When all the expired timers have been processed, AEX 703 goes back to waiting for messages 108.

Figure 14:
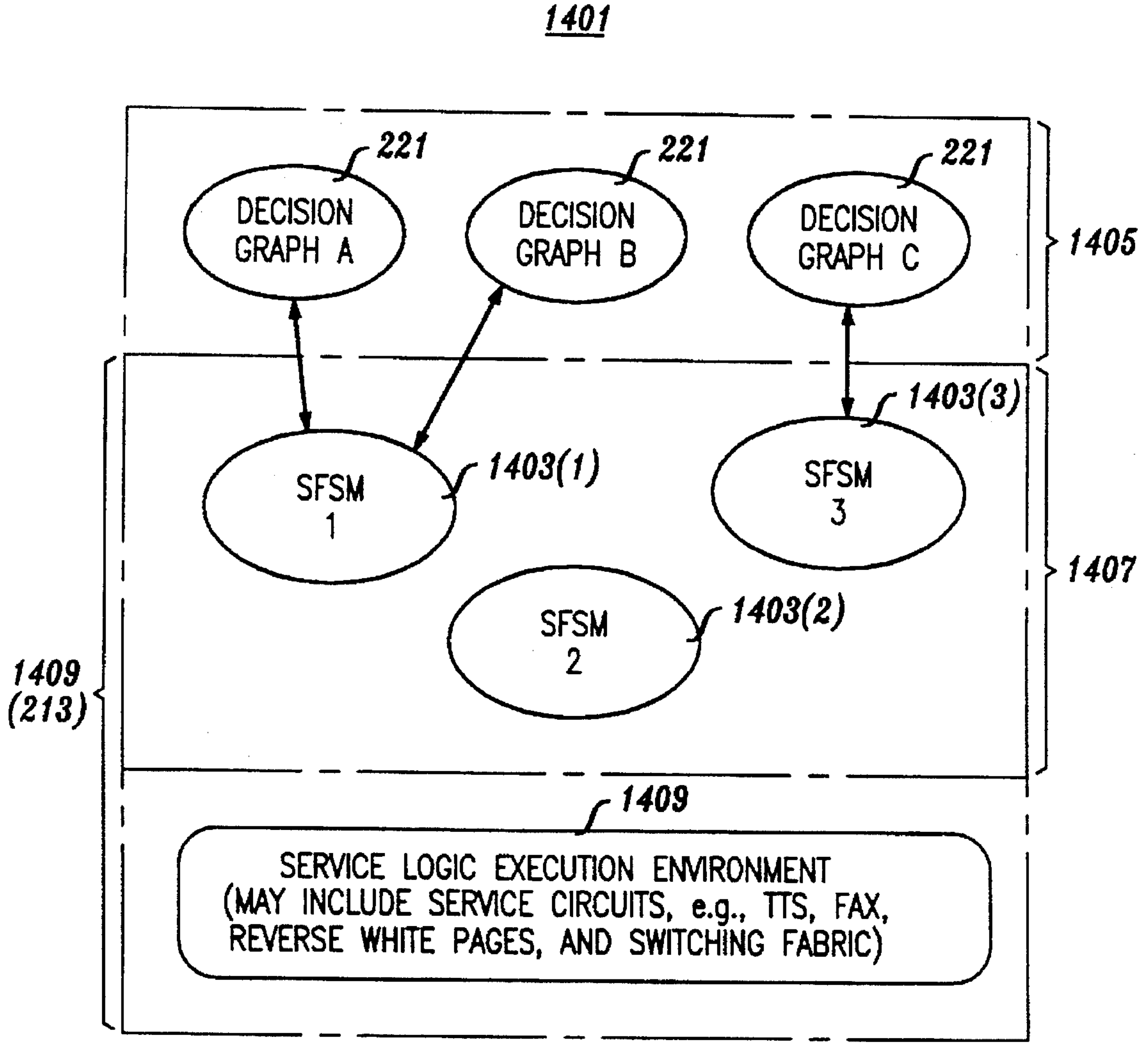
FIG. 14 is a diagram showing the heirarchy of levels used to program a service.

Defining a Service: FIG. 14

What service process 701 does when it executes a service for a subscriber is determined by the code executed by service process 701 and the values of the data used in the code. As previously pointed out, the data which a service process 701 uses when it executes the code includes decision graphs 221. FIG. 14 shows the kinds of code executed by service process 711 and the relationship of decision graphs 221 to that code. Programming architecture 1401 for a service has three levels: decision graphs 221, at level 1407, service finite state machines (SFSM) 1403 at level 1407, and service logic execution environment (SLEE) at level 1409. As previously explained, decision graphs 221 are part of service package data 801; finite state machines at level 1407 and SLEE 1409 correspond to service package code 213 in FIG. 2. Beginning with SLEE 1409, that component consists of a set of library routines which are compiled into the code for every service. The library routines provide the interfaces to the code executed by the SCH processes in system 1601. Level 1407 contains one or more finite state machines machine for each service provided by service node 501. Each of the finite state machines responds to some of the events related to the service. A given finite state machine 1403 may employ one or more decision graphs 221. The decision graphs may be global, i.e., apply to all users of a service, or may be part of the per-subscriber datat for service process 701.

The three levels of architecture 1401 further correspond to three levels at which a service may be defined. In general, the routines in service logic execution environment 1409 are provided by the manufacturer of service node 501, though they may be modified by the telephone company which uses service node 501. The service finite state machines 1403 will generally be provided by the telephone company which uses service node 501, though the manufacturer may provide some services, and in some cases, sophisticated subscribers to services may provide finite state machines 1403. The decision graphs 221, finally, may be provided by the telephone company, or in many cases by the subscribers. Architecture 401 thus allows each party involved in defining a service to define the level for which the party has the expertise and information and further insulates each level from the effects of changes in the higher levels.

Further, each level employs its own coding techniques. The techniques used at a level correspond to the expected degree of expertise of the persons doing the programming. SLEE 1409 is produced by experienced systems programmers; consequently, the language used at that level is C++. The service finite state machines 1403 of level 1407 will generally be produced by experienced applications programmers; consequently, the language used at that level is an application-oriented language called service logic language (SLL). As will be explained in more detail below, SLL permits the programmer to directly describe a finite state machine. The decision graphs 221 at level 1405, finally, will be produced by subscribers or also by telephone company craft people engaged in provisioning service node 501. Consequently, producers of decision graphs 221 are provided with a graphical user interface which allows the producer to directly specify a decision graph on a graphics terminal. As previously indicated, specification of a decision graph on a graphics terminal results in the production of a graph definition file 1001, from which an instance of a C++ decision graph type is produced when the service is provisioned with the graph in graph definition file 1001. With regard to code written in SLL, an SLL compiler generates C++ code from the SLL code. The C++ code specifying the decision graph type, state machine 1403, and SLEE 1409 is then compiled to produce the executable code required by the processor upon which service process 701 is executing.

In a preferred embodiment, there is also a correspondence between the levels of architecture 1401 and the processes of service package application 609. The service finite state machine 1403 for a service is executed by service process 701, while the service logic execution environment code 1409 for the service is executed for the most pan by AEX 703 corresponding to service process 701.

Defining a System Finite State Machine 1403 in SLL: FIG. 15

FIG. 15 shows a SLL program 1502 which defines a system finite state machine 1501. Finite state machine 1501 has a single state, in which it responds to a telephone number by playing an announcement.

SLL program 1502 has two major parts: data declarations 1507 and state sequence 1515. Beginning with data declarations 1508, finite state machine 1501 has no static data 801; per-subscriber data 803 consists of the following:

- access data 1505, which defines which directory numbers may be used to access the serviced corresponding to state machine 1501;
- recent change data 1509, which is other data which may be changed during provisioning of the service corresponding to state machine 1501. Here, the recent change data is a character suing for the announcement to be made when the number specified in access 1505 is called. The announcement itself is generated from the suing by text-to-speech apparatus controlled by CSCF SCH process 613.
- Measurement data 1511, which is data which is collected by the service as it operates for provision to processes in administration processes 611. Here, the declaration specifies that the data is to be collected every 60 minutes, and that the data to be collected includes counts for the number of times the announcement was made, the number of times the announcement failed to be made, and the number of times the caller hung up before the announcement was completed.
- The per-call data 1513, indicated by the declaration "dynamic" consists here only of the port at which the call is received in service node 601.

Continuing with sequence of states 1515, here, there is only one state, "Initial", as indicated by the bracket "state Initial—end state Initial". In this state, state machine 1501 can respond to event messages 108 which are addressed to service process 701 and which specify one of four types of event. Corresponding to each type of event is an event block 1517 which has the name of the type of event which event block 1517 handles. When service process 701 executing state machine 1501 receives an event message belonging to one of the four types, it responds thereto by executing event block 1517 corresponding to the event's type. In other state machines having more than one state, the state machine will immediately respond to an event message 108 by executing event handler 1517 corresponding to it only if handler 1517 is a default event handler (i.e., defined within code 1502 but outside any state) or if there is an event handler 1517 for the message 108 in the current state of state machine 403. Otherwise, it will respond to the message when it has reached the state in which a handler for the event message 108 is defined. If there are both a default event handler and an event handler in the current state for the message type, the event handler in the current state is executed. Transition from one state to another occurs when an event handler containing a statement specifying the transition is executed.

The four states function as follows:

"terminating$_{13}$ call" responds to a message from AEX 703 indicating that a caller has called the number specified in access 1505. The actions taken by the event handler include setting the dynamic variable Caller_port to the port at which service node 501 received the call and sending messages to AEX 703 which will result in the announcement declared at 1509 being sent to that port;

"tts!send_completed" responds to a message from AEX 703 indicating that the announcement was sent. The actions taken by the event handler include releasing the port and incrementing the counter TTS_succeeds in measurement data 1511.

"tts!send_failed" responds to a message from AEX 703 indicating that the attempt to send the announcement failed; the actions taken are the same as for "tts_send_completed", except that a different variable in 1511 is incremented.

"disconnected" responds to a message from AEX 703 indicating that the caller hung up. Again, the handler releases the port and increments the relevant variable of measurement variables 1511.

In a preferred embodiment, each type of event has an event record data object defined for it. When AEX 703 sends an event message 108 to its corresponding service process 701, it places the data corresponding to the event in a memory location accessible only to the event handier for the message. The event handler can then use the data in responding to the event.

Three kinds of SLL statements may occur within an event handler. The first are conventional statements, such as assignment (set and reset statements), two way branch (if statement), multi way branch (test statement), and table manipulation (search, loop, insert, and delete statements). The second are service specific statements such as traversing a decision graph (traverse and traverse[18] continue statements), scheduling an event for some time in the future (schedule statement), and invoking actions that interact with the SCH processes. An example is the tts!send statement in program 1502, which causes a text message to be converted into speech and sent to the caller. The third kind is statements which transfer control between event handlers and between states. The next¯state statement transfers control to a state named in the statement, while the next¯event statement does the same with regard to a named event handler in the state containing the statement. In the preferred embodiment, the actions that are invoked with names such as tts!send are implemented in library routines which are compiled into the code executed by AEX 703 corresponding to the service process 701 executing the state machine.

As regards data, SLL includes basic data types, such as flags, numbers, and strings and many data types that are telephony specific such as ports, per subscriber tables with per call indexes, and decision graphs. SLL supports extensive data update capabilities that allow the programmer to specify the data update properties a data variable should have (e.g., static, dynamic, recent changeable, or measurements), and the SLL compiler takes care of implementing the details to fulfill those properties. The maintenance personnel and service users perform recent changeable data updates through a common forms interface. Default forms for recent change are automatically generated by the compiler based on the programmer's declarations.

Using Decision Graphs 221 in SLL Programs: FIG. 16

FIG. 1601 is a fragment 1601 of SLL code which has more than one state. Each state is defined by a state block 1615 which is bracketed by "state <name>—end state <name>". When executed, "next state" statement 1611 causes a transition from the state in which the statement occurs to the state specified in the statement.

FIG. 16 further shows how the traversal of a decision graph 221 is specified in an SLL program and how a SLL program may define an action which results from the traversal of a user-defined node of decision graph 221. To begin with, the declaration 1604 "Graph1" in rc data 1509 declares a per-subscriber decision graph of that name. The graph is shown at 1607 in FIG. 16. The action statement "dg!traverse Graph1" 1609 specifies that "Graph1" is to be traversed at that point in the execution of the event handier 1517 for "terminating_call". Graph1 1607 has three nodes: a system-defined "day" decision node which chooses among the branches depending on the time of day, and two terminal nodes, one, connect, which is system-defined and which, when traversed, connects the caller to a telephone number specified in the node's data and then returns an event message to service process 201 executing the SLL program, and another, TTS_final, whose action when traversed is user-defined, and consequently must have an event handier in code 1601.

The "TTS_final" node is specified as a leaf node with a user-defined action in declaration 1603. In declaration 1603, "node" specifies that TTS_final belongs to the class of decision graph nodes and "terminate" specifies that it is a leaf node within that class. "Text string" indicates that when the node is traversed, an event record resulting from the node traversal will contain a string value. Event handler 1613 has the name of the TTS_final node and is thereby identified as the event handler which will be executed by service process 701 when traverse action 1609 is executed and the traversal ends at the TTS_final node. As indicated by the tts!send action in the event handler, the result of the traversal of the node is the sending of an announcement. The expression "text=TTS_final.Text" indicates that the text used for the announcement will be that specified in the event record produced when T-S_final was traversed.

Figure 17:
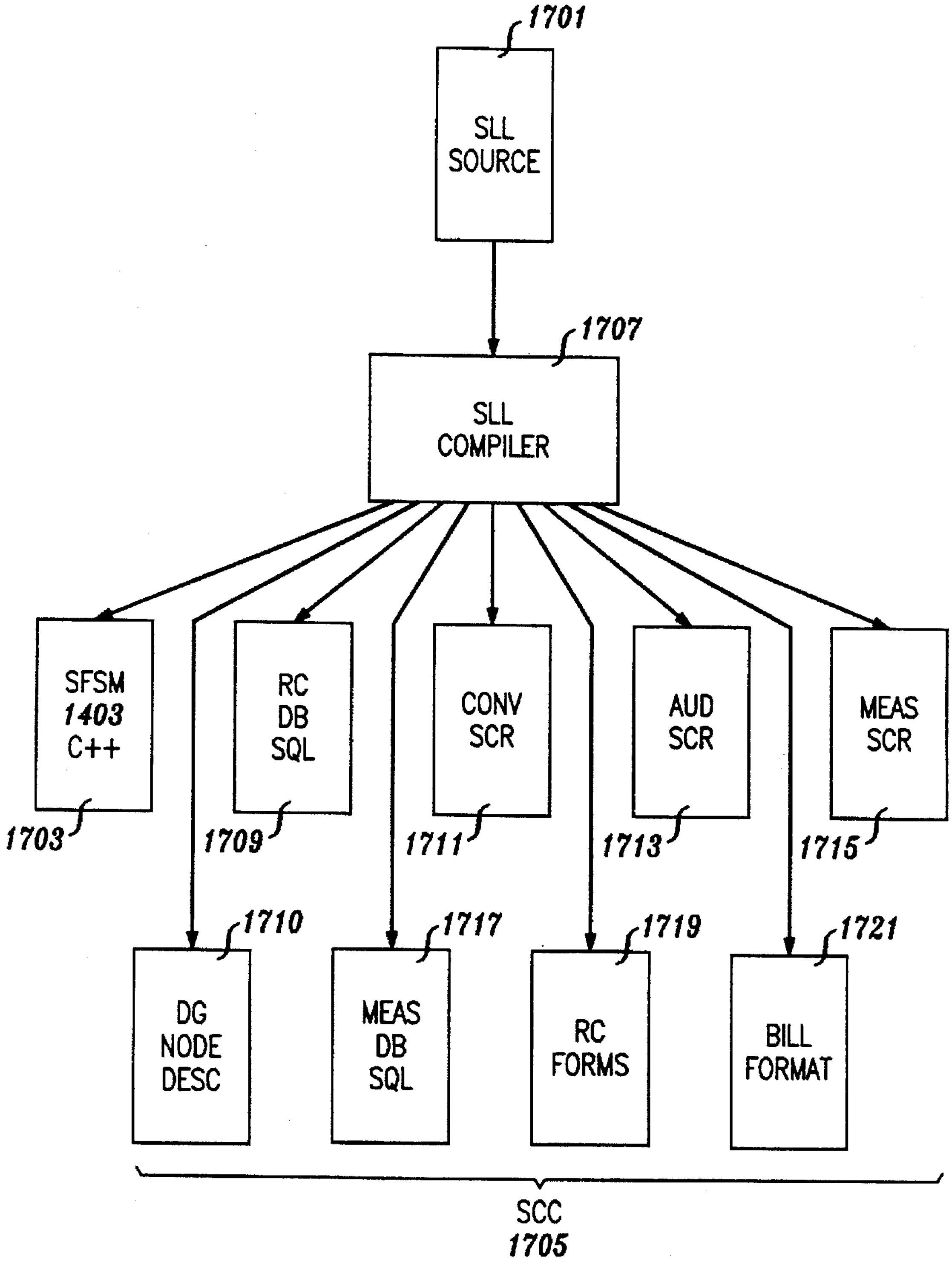
FIG. 17 is a diagram showing the outputs of the compiler for the service logic language compiler.

Compilation of SLL Programs: FIG. 17

An important innovation in a preferred embodiment of service node 501 is that the compiler for the SLL language not only produces the C++ code defining service finite state machine 1403 for the service, but also produces various kinds of system characterization code (SCC) in other languages which is employed by processes in ADMIN 611 to provision and alter the services. FIG. 17 shows the output from a preferred embodiment of SLL compiler 1707 when it compiles SLL source 1701. The C++ code for SFSM 1403 is shown at 1703; the remaining outputs all belong to system characterization code 1705. Included among them are:

The code 1709 in the SQL query language required to create records in data bases belonging to ADMIN 611 processes for recent change data;

Descriptions 1710 of user-defined decision nodes which can be used by the decision node editor;

The code 1717 in the SQL query language to create records in data bases belonging to ADMIN 611 processes for measurement dam;

UNIX shell scripts 17 11 for converting per-subscriber data from one service into a form proper for another service;

Forms 1719 used to edit recent change data in a service;

Unix shell scripts 1713 for initiating periodic audits of system 601;

Formats for billing of subscribers for use of a service; and

UNIX shell scripts 17 15 for producing measurement reports from the data base records.

As may be seen from FIG. 15, the information required to create SCC 1705 is contained in data declarations 1507 of the SLL program, which specifies the subscribers for the service in access 1505, the recent change data in rc 1509, and measurement data in measurement 1511.

Figures 18, 19:
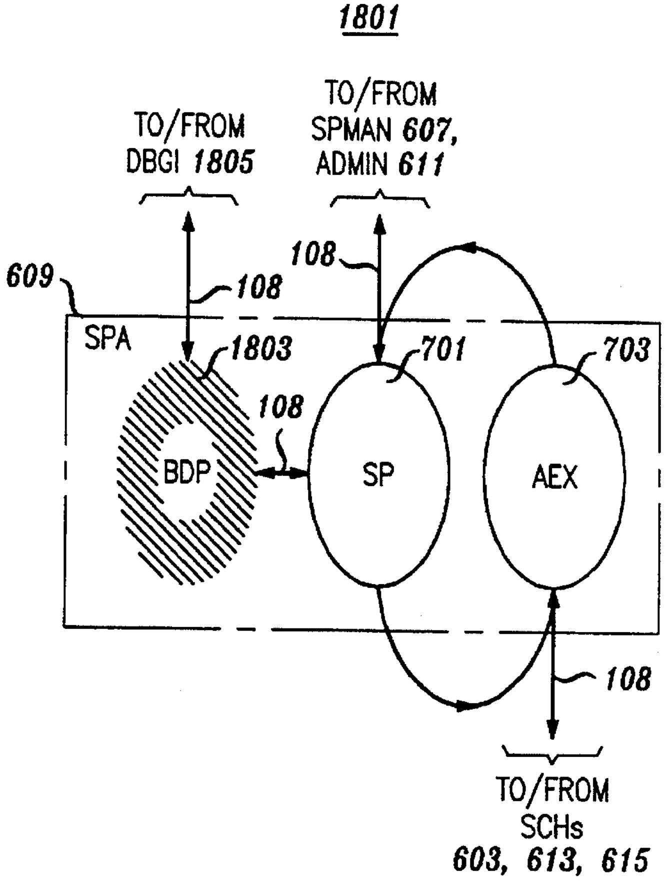
FIG. 18 is a diagram showing the debugging system in a preferred embodiment of the service node.
FIG. 19 is a diagram showing classes of decision graph nodes.

Debugging a Service: FIG. 18

FIG. 18 shows debugging system 1801 used to debug a service. As shown in that figure, when a service is being debugged, a base debugging process 1803 is created in SPA 1609 in addition to the SP and AEX processes. The debugging process 1803 communicates by means of messages 108 with a debugging process in administration processes 1805, which in turn provides debugging information to and receives debugging information from a terminal being used by the programmer doing the debugging. Additionally, debugging process 1803 communicates by means of debugging messages 108 with service process 701 which is executing the SLL code being debugged.

The debugger used in debugging system 1801 is an application level debugger that allows Service Packages that are written in the Service Logic Language (SLL) to be debugged in the context of the SLL code, rather than the generated C or C++ code. Because application programmers work at the SLL source level, those programmers do not have to understand the C or C++ code that is generated by the SLL compiler.

SLL programmers can set, release, enable, or disable breakpoints for SLL line numbers, event handlers, or state transitions. It is possible to qualify a breakpoint using Boolean expressions. Since the debugger operates at the SLL level, data is displayed and accessed in terms of the SLL program. If a user needs to access any other data items (e.g., stack backtrace data), the application level debugger accepts commands for the underlying C/C++ debugger that is provided by the control computer vendor. Data dumps can be viewed on the screen or directed to an output file.

The SLL debugger also allows the application programmer, when testing, to send events via BDP 1803 to the Service Package that is being debugged. These event reports can contain the data that would be provided if the event were delivered from service node 501 to the application program. The programmer can test the software that designed to respond to an event such as a disconnect by generating a disconnect report through the debugger.

The user interface for the interactive application level debugger is both graphical and textual. The graphical interface is Open Look™ compatible. The SLL source code can be viewed on the screen, and tracing can be turned on so that program statements are highlighted as they are executed. When used in the noninteractive mode only the textual interface is supported. The text interface is curses based and can be used on any terminal.

A command language is provided to allow a user to perform the features described above. It also allows a user to save a debugging session in a file and to restart a session from a certain point. This file can be edited. A mouse based graphical interface can be used in the interactive mode.

The SLL programmer can establish breakpoints that trigger when events from the DBGI process arrive at the SP. The debugger also allows the programmer to create events and inject them into the Service Package that is being debugged to check the robustness of the package. The SLL debugger can be used on the programmer's workstation to debug an SP process 701.

Figure 20:
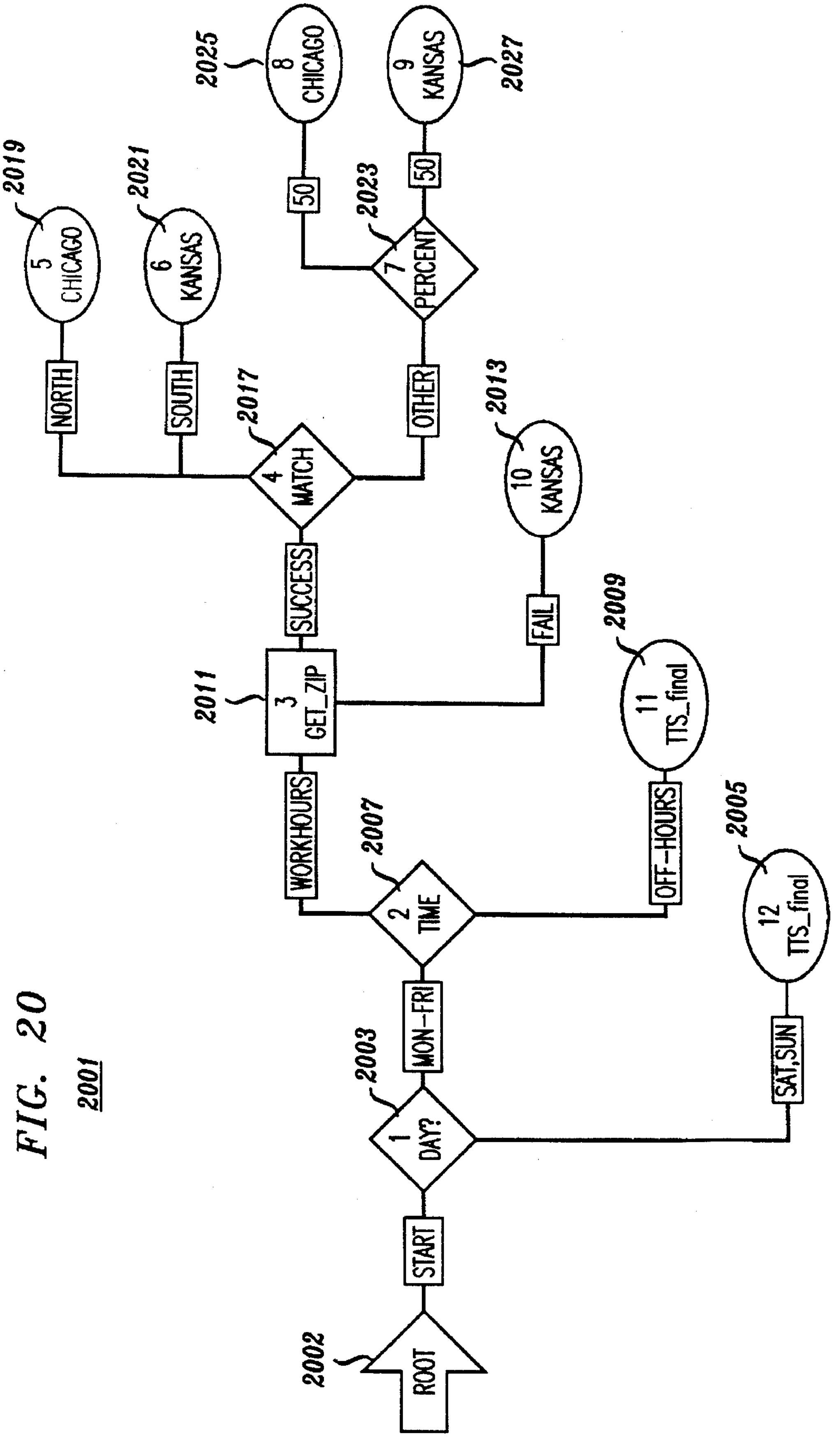
FIG. 20 is a diagram of a decision graph as it appears on a decision graph editor.
Figure 21:
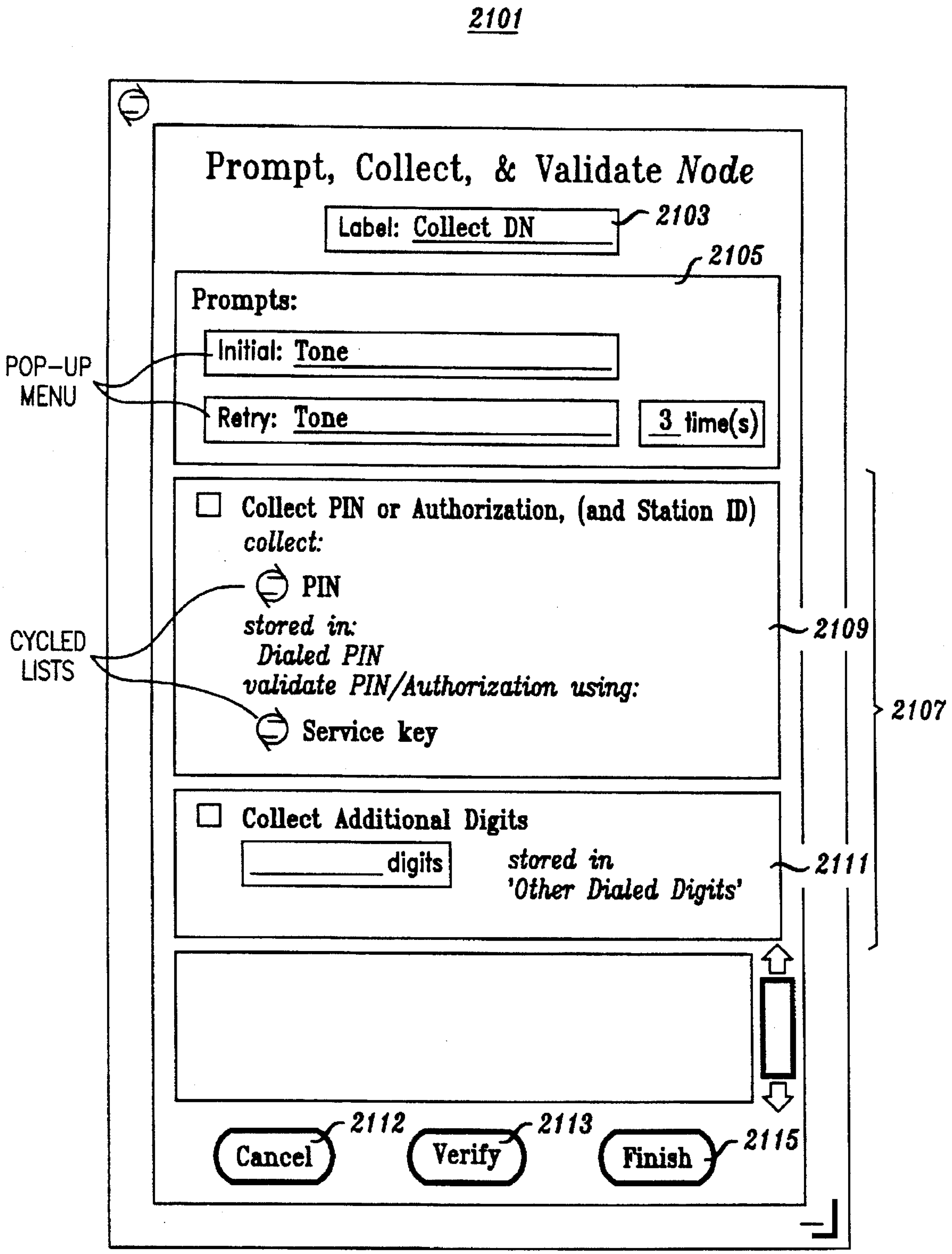
FIG. 21 is a diagram of a node definition window in the decision graph editor.

Details of Decision Graphs 221: FIGS. 19–21

In a preferred embodiment, there are three categories of nodes:

decision nodes, which determine which branch of the decision tree is to be traversed;

Action nodes, which perform an action when they are traversed and branch depending on the success or failure of the action; and final nodes, which are the leaf nodes of the decision graph. When these nodes are traversed, they perform an action and terminate the traversal.

User-defined nodes may belong to any of the above categories; in addition, there are eight classes of system-defined decision nodes. The classes and the shapes used to define nodes belonging to the classes in the graphical decision graph editor used in system 601 are shown in FIG. 19. The eight classes are the following:

decision nodes 1901. Nodes belonging to this class determine which one of a plurality of branches will be followed in the traversal.

hand-off nodes 1903. Nodes belonging to this class specify that the traversal of one decision graph will cease at the node and that the traversal of another decision graph, identified in the hand-off node will begin. The decision graph whose traversal will begin may belong to another subscriber for the same service or to another service.

final nodes 1905: nodes belonging to this class are the leaf nodes of the decision graph.

prompt, collect, and validate (PCV) nodes 1907: nodes belonging to this class specify that the service is to provide a prompt to a caller, collect data provided by the caller, and validate the data. If any of these steps fail, the traversal of the decision graph terminates.

root node 1909: this is simply the point at which the traversal of the decision graph starts. There is accordingly only one root node per decision graph 221.

assign nodes 1911: nodes belonging to this class assign values to variables accessible via SP 701's call data object for the call.

GOTO nodes 1913: nodes belonging to this class transfer the traverse from the GOTO node to a COME IN node in the same decision graph. The COME IN node is specified in the GOTO node.

COME IN nodes 1913: nodes belonging to this class receive a traverse transferred from a GOTO node.

The decision node class and the final node class belong to the decision node and final node categories respectively; the remaining classes belong to the action node category.

Several types of system-defined nodes may belong to each of the above classes. The types which exist in a presently-preferred embodiment are the following:

Hand-off: a system-defined hand-off node;

Prompt, collect, validate: a system-defined prompt, collect, validate node;

Assign Nodes

1. A string assignment node for concatenating suing values accessible from the call data object 1203 for a call and assigning them to a suing variable accessible from that call data object.
2. A table translation node for using a key contained in a variable accessible from the call data object to look up a table entry containing a value and assigning the value to another variable accessible from the call data object.
3. A counter node for storing the value of a variable specified in the node in a UNIX file.

Decision Nodes

1. A percent node for sending fixed percentages of the calls received for a subscriber to different branches of the decision graph.
2. A day of week node for deciding which branch of the decision graph to take based on the day of the week in which the call is received.
3. A string length node for deciding which branch of the decision graph to take based on the length of a suing variable accessible from the call data object.
4. A call variable node for deciding which branch of the decision graph to take by matching part or all of the contents of a string variable accessible from the call data object with a string in a branch table entry and then taking the branch of the decision tree specified in the branch table entry.
5. A time of day node for deciding which branch of the decision graph to take based on the time of day at which the call is received.

Final node types

1. A connect node for connecting the call to a directory number specified in the node. The directory number may be a constant or may be contained in a variable accessible to service process 701 when it is executing the service for the subscriber for whom the service is being performed. The node may further specify one or more alternate directory numbers.
2. An announce node for specifying an announcement to made in the call. The announcement is contained in a string variable accessible to process 701 when it is executing the node for the subscriber for whom the service is being performed.

Goto: A system-defined GOTO node.

Come Into: A system-defined COME INTO node.

FIG. 20 shows a decision graph 221 which routs a call during business hours to an office in a location which is determined by the caller's zip code and which provides messages to the caller outside business hours. The representation of the decision graph in FIG. 20 is substantially the same as that which appears to a person creating or editing the decision graph using the decision graph editor which is provided as pan of system 601.

Root node 2002 indicates the point at which a traverse of decisiong graph 2001 is to begin; node 2003 is a system-defined day of week decision node; node 2007 is a system-defined time of day decision node; nodes 2005 and 2009 are system-defined announce final nodes. Get-zip node 2011 is a user-defined action node whose traversal results in the execution of an event in service finite state machine 1403 for the service. In executing the event, finite state machine 1403 sends an action message 108 to its AEX 703 to which AEX 703 responds by sending an action message 108 to reverse white pages SCH process 603 which provides the caller's telephone number. In response, process 603 returns a message 108 to AEX 703 which either contains the zip code or indicates that process 603 failed to find one. AEX 703 then provides a message with the same contents to finite state machine 1403. Finite state machine 1403 has event handlers for both a message 108 containing the zip code and a message 108 which does not contain the zip code. The event handler for the message with the zip code places the zip code in a variable for the call and executes the traverse continue statement specifying the branch to node 2017. The event handler for the message without the zip code executes the traverse continue statement specifying the branch to node 2014, which is a system-defined connect node which connects the caller to a number in Kansas. Completion of the connection of course completes the traversal of the graph.

On execution of the traverse continue statement specifying node 2011, the variable containing the zip code is used in system-defined table translation node 2017 to select one of three branches. Two of the branches end in system-defined connect nodes 2019 and 2021; the third branch leads to a system-defined percent decision node which directs fixed percentages of the calls to the branches ending in connect nodes 2025 and 2027 respectively. Again, completion of connections by the connect nodes completes the traversal of the graph.

FIG. 21 shows an example of the graphical interfaces used to define nodes in the decision node editor. Window 2101 is the window used to define a prompt, collect, and validate action node. Similar windows exist for each of the system-defined node types, as well as for user-defined node types. In window 2101, the data necessary to define the node's action is entered in fields in the window. Field 2103 receives the name of the node; the fields in 2105 define the prompts used to obtain the information. In a preferred embodiment, an initial prompt and a retry prompt are defined, along with the number of retries which are to be made. Pop-up menus are further available which show what options are available for the field. The fields in section 2107 indicate what kind of data is to be collected. There are two possibilities: digits which have meaning only for the relevant service, whose collection is specified in 2111, and digits which serve as an identification for users of the service (for example, a personal identification number (PIN) or authorization code), whose collection is specified in 2109. In the latter case, the service for which the PIN or authorization code is valid is also specified.

Buttons 2112, 2113, and 2115 at the bottom of window 2101 permit the user of the editor to cancel his entries (button 2112), verify the correctness of the node (button 2113) by invoking a verification program which checks the node for consistency with other portions of the decision tree and the SLL program for the finite state machine 1403 which will traverse the decision tree, and to finish the node (button 2115) by verifying it and if it passes, closing window 2101 and displaying the newly-defined node on the terminal. The new node can then be moved to the proper branch of the tree and linked in.

Detailed Example of Operation of System 601: FIGS. 22–25

To conclude the discussion of a preferred embodiment of system 601, there will be presented a list of the messages 108 exchanged by the processes of the preferred embodiment, followed by a detailed scenario showing the execution of a service by the components.

SPA 609 Message Interfaces

SPA 609 has several interfaces that exist between the components of SPA 609. There is a message interface between SP 701 and AEX 703, a message and data interface between SP 701 and DGB 705, and a set of messages that SP 701 sends to itself. These interfaces are discussed below. The interface between the SLL debugger and SP 701 is discussed in the "External Interfaces" section.

1.1 SPP to AEX Messages

These are SP 701 to AEX messages.

1.1.1 SPaccept Call

Sent by SP 701 to AEX 703 to tell the Central Office (CO) to send audible on the port. It contains a call id, an AEX call record id, and a port number (HWid, CRV).

1.1.2 SPanswer

Sent by SP 701 to AEX 703 to answer the call. It contains a call id, an AEX call record id, and a port number (HWid, CRV).

1.1.3 SPcall for Transfer

Sent by SP 701 to AEX 703 to originate a call from the SN to another DN (directory number). It contains a call id, an AEX call record id, an originating DN, a terminating DN, the port already in use and a timeout. This puts the active call on hold, and if there is no active call it will fail.

1.1.4 SPcall with Dropback

Sent by SP 701 to AEX 703 to originate a call from the SN to another DN. This action causes the call to be transferred back to the central office before the call is answered. It contains a call id, an AEX call record id, an originating DN, a terminating DN, the port already in use and a timeout.

1.1.5 SPdnid Lookup

Sent by SP 701 to AEX 703 to perform a database query for the white pages data for a given DN. The message contains a call id, an AEX call record id, and a DN.

1.1.6 SPend Call

Sent by SP 701 to AEX 703 to end a call. All resources associated with the call id are released by AEX 703. The message contains the call id and an AEX call record id. This causes all resources associated with the call id to be released.

1.1.7 SPerror

Sent by SP 701 to AEX 703 to send to CRAFTI of administrative processes 611. The message contains a call id, an AEX call record id, and a character siring. This is an internally generated message not available at the SLL language level, that is used for alarms.

1.1.8 SPexit

Sent by SP 701 to AEX 703 when SP 701 is ready to exit.

1.1.9 SPprint

Sent by SP 701 to AEX 703 to have a string printed. The suing in this message can be sent to the logging process. The message contains a call id, an AEX call record id, and a character string.

1.1.10 SPrelease Port

Sent by SP 701 to AEX 703 to release the port. The message contains the call id, an AEX call record id, and a port number (HWid, CRV). For this message, AEX 703 ignores the CRV value and only uses the HWid. If the port that is released is part of a connected path the path is broken before the port is released.

1.1.11 SPstartup Complete

Sent by SP 701 to AEX 703 so that AEX 703 knows that SP 701 has finished initialization.

1.1.12 SPsync Call

Sent by SP 701 to AEX 703 so that AEX 703 has SP 701 calldata id for the call. The message contains the call id, and SP 701 calldata id.

1.1.13 SPtransfer

Sent by SP 701 to AEX 703 to transfer a party A call that comes to SN 501 to a party B call that also comes to SN 501, and end up with the call being handled by the central office. This message contains the call id, an AEX call record id, a port number (HWid, CRV) for A party and a port number (HWid, CRV) for B party.

1.1.14 SPtts Send

Sent from SP 701 to AEX 703 to request that text be played by a text- to-speech peripheral over the specified BRI port (port for a basic rate interface ISDN line). This message contains the call id, an AEX call record id, the port number (HWid, CRV) (BRI port from the CO) and a character string of text to play on the port.

1.2 AEX to SP Messages

These are AEX 703 to SP 701 messages.

1.2.1 SPcall Alerting

This response indicates that the alerting message has been received on the BRI port and that the phone is tinging. The message contains the call id, the calldata id, the terminating port number and the terminating DN.

1.2.2 SPcall for Transfer Failed

This response indicates that the SPcall_for_transfer was not carried out and gives the reason for the failure. The message contains the call id, the calldata id, the terminating DN, and two status strings for the two call appearances, and a reason string that describes the reason for the failure. Depending on the error case, the call may be returned to the state that it had before the command was performed.

1.2.3 SPcall with Dropback Complete

This message indicates that the calls have been successfully transferred back to the CO (central office). The message contains the call id, the calldata id, and the port number (HWid, CRV).

1.2.4 SPcall with Dropback Failed

This response indicates that the SPcall_with_dropback was not carried out and gives the reason for the failure. The message contains the call id, the calldata id, the terminating DN, and two status strings for the two call appearances, and a reason string that describes the reason for the failure. Depending on the error case, the call may be returned to the state that it had before the command was performed.

1.2.5 SPanswered

This message indicates that the call associated with the specified port has been answered. The message contains the call id, the calldata id, the port, the DN that answered, and a time stamp (seconds).

1.2.6 SPanswered Timeout

This message indicates that the call associated with the specified port has timed out waiting for answer. The port is released by AEX 703. The message contains the call id, the calldata id, the called DN and the port.

1.2.7 SPcall Proceeding

This response indicates that the call is in progress. The message contains the call id, the calldata id, and the port number.

1.2.8 SPdisconnected

This message indicates that a disconnect was detected on the specified port. The message contains the call id, the calldata id, the port number (HWid, CRV) and a time stamp used for billing purposes.

1.2.9 SPdnid Returned

This message returns the name and address associated with the specified DN. The message contains the call id, the calldata id, the DN, a name character string and an address character string.

1.2.10 SPexit Ack

This message is sent from AEX 703 to SPA 609 when AEX 703 has completed releasing all the resources that it is managing for SPA 609.

1.2.11 SPterminatingCall

This message indicates that the SN has received a call from a service subscriber on a terminating port. The message contains the call id, the calldata id, the originating DN, the dialed digit string (called number), the redirecting number (null if not available) and the port number (HWid, CRV).

1.2.12 SPtts Send Complete

This message indicates that the text-to-speech peripheral has completed playing speech to the specified port. The message contains the call id, the calldata id, and the port number (HWid, CRV).

1.2.13 SPtts Send Failed

This message indicates that the attempt to convert the text-to- speech and play the speech to the specified port failed for the specified reason. The message contains the call id, the calldata id, a port number (HWid, CRV), and a reason character string.

1.2.14 SPtransfer Complete

This message indicates that the attempt to transfer the calls of party A and party B was successful. The message contains the call id, the calldata id, and the two port numbers (HWid, CRV) for the parties transferred.

1.2.15 SPtransfer Failed

This message indicates that the attempt to transfer the calls of party A and party B failed. The message contains the call id, the calldata id, two port numbers (HWid, CRV), two status strings and a reason character string.

2 SPP to Itself Interface

These messages are in two groups. First for Decision Graphs (DG), a traversal (or traversal continuation) can be initiated at any time by the SLL code, but it will not actually start until the present event handler finishes. Second, when UNIX timers expire, the event triggered by that timer must not be done immediately. It is postponed until the present event handler finishes by sending a message to SPA 609 that the timer fired.

2.1 SPtraverse

Start the traversal of a DG. The message describes which DG is to be traversed and for which active call.

2.2 SPtraverseContinue

Continue the traversal of a DG. The message describes which DG is to be continued, for which active call and for which branch.

2.3 SPreportMeasurement

This message is sent to the SPA when it is time to report some measurements to the MEAS subsystem. The message describes which measurements should be sent.

2.4 LLEtime Out

This message indicates a start_timer() action has expired without a corresponding stop_timer() having been done. It has a field that describes the call that started the timer.

2.5 LLEschedule Call

This message means a schedule statement has expired. The message includes the DN of the customer that started the schedule, and arbitrary user data.

2.6 SPsplit

Some tasks (such as reporting measurements or performing an audit) take too long to do without a real-time break. When performing a long task, SP 7016 will send itself SPsplit messages to break up the task.

3. Extermal Interfaces

The sections below describe the external interfaces to SPA 609. Each of the messages described below is derived from the Message Handler message class that is used as a base class for all messages and thus includes the data for the base class. This base class contains data for priority type, a message type and the senders message QID. If an SPA 609 receives a message it does not understand, it will make a Craft log entry about the message and ignore the message.

3.1 MSGH Interface 3.1.1 Communicating Via Messages with Other Processes

SPA 609 will use MSGH 605 for creating its input message queue and for finding the input message queues of all other processes with which SPA 609 needs to communicate.

3.2 SPMAN 607 Interface

The messages from SPMAN 607 to an SPA 609are described, and then the messages from an SPA 609 to SPMAN 607.

3.2.1 Messages from SPMAN 607 to SPA 609

The messages that are sent from SPMAN 607 to SPA 609 are described below.

3.2.1.1 SAspAud—Subscriber Re-Registration Audit

This message tells SPA 609 that SPMAN 607 to start an audit of the DN routing tables. SPA 609 will send a few (around 20) ReRegister messages to SPMAN 607 and then send itself an SPsplit message (see above) to give Call Processing messages a chance to be processed. After all ReRegister messages have been sent, SPA 609 will send the SPauditAck message to SPMAN 607 tell it this SPA is done with the audit.

3.2.1.2 SAspExit—SPA Exit

An exit can be either conditional or unconditional. When SPMAN 607 sends this message to SPA 609, it has arranged that no more calls will route to this SPA. A conditional exit tells SPA 609 to wait for all active calls to finish. An unconditional exit tears down all active calls. In both cases SPA 609 will then exit as described in section 3.3.

3.2.1.3 SAspSan—SPA Sanity

SPMAN 607 wants to know if the SPA is sane. When SPA 609 is operating correctly, it will respond with another SAspSan message back to SPMAN 607.

3.2.1.4 SAsubRegAck

Sometimes when SPA 609 registers a DN (especially when a Form has changed an access DN) it wants to know if SPMAN 607 has accepted the new DN. The SAsubRegAck message is sent to SPA 609 from SPMAN 607 when a register is successful and an acknowledgement was requested in the register message.

3.2.2 Services of SPMAN 607 Used by SPA 609

The services of SPMAN 607 that are used by SPA 609 are described below.

3.2.2.1 Routing

SPMAN 607 keeps track of the Directory Numbers (DNs) that route to each SPA. SPA 609 may ask SPMAN 607 to update these tables so that either new customers start to route or that former customers no longer route to SPA 609.

3.2.2.2 Automatic Restart

If SPMAN 607 detects that SPA 609 is not functioning, (either because SPA 609 core dumped or the SPA does not respond to sanity messages) SPMAN 607 will kill the existing SPA, and start a new one.

3.2.2.3 Overload

If SPA 609 determines that it is overloaded (so that all customers are getting poor service) it can tell SPMAN 607 it is overloaded, and SPMAN 607 will stop routing new calls to SPA 609. (These calls will be rejected, on the philosophy that it is better to give good service to most and reject a few, than to give bad service to all.) Once SPA 609 feels it is not overloaded anymore, it will tell SPMAN 607 to resume routing new calls to SPA 609.

3.2.2.4 Routing Audit

When SPMAN 607 starts an audit, SPA 609 uses an SPMAN 607 function to access SPMAN 607's shared memory tables to check that the DNs stored in the table match the customer DNs for SPA 609. SPA 609 then sends SPMAN 607 messages to correct any discrepancies.

3.2.2.5 Debugging

An SPA can send to SPMAN 607 the SADebug message to tell SPMAN 607 that this SPA is being debugged. While being debugged, SPMAN 607 will still route calls to the SPA but SPMAN 607 will neither audit SPA 609 nor send it sanity check messages.

3.3 DB Interface

The messages from DB to an SPA are described, and then the messages from an SPA to DB.

3.3.1 Messages from DB to the SPA

There is no audit defined between an SPA and the DB subsystem of ADMIN 611. It is the responsibility of the SPA programmer to implement any DB audit desired using the DBselect message to reread the DB and compare the DB tables to the SPA data.

3.3.1.1 DBselectAck

DB is sending the results of a DBselect request back to SPA 609.

3.3.2 Messages from SPA to DB

The messages that are sent from SPA 609 to the DB subsystem are described below.

3.3.2.1 DBselect

After a reboot, SPA 609 needs to read all of the customer data for SPA 609 from the DB tables of the SPA. SPA 609 send a DBselect message to DB for each table SPA 609 maintains. The DBselectAck messages from DB are used to populate SPA 609 in-memory data structures.

3.3.2.2 DBupdate

When an assignment is made to a static variable, this change must be stored in the DB. SPA 609 will send a DBupdate message to update the static variable. SPA 609 will not expect any acknowledgement about this update.

3.3.2.3 DBinsert

When an SLL insert statement is executed on a static table, the corresponding DB table will be updated with a DBinsert message. A DBinsert will also be used to record a new schedule statement in the DB schedule table for this SPA.

3.3.2.4 DBdelete

When an SLL delete statement is executed on a static table, the corresponding DB table will be updated with a DBdelete message. A DBdelete will also be used to remove schedule statement from the DB once the schedule has fired.

3.4 Messages from a DB Form

The following messages are sent from a DB Form to an SPP.

In all cases, when a form changes the routing information for a customer of an SPA, SP 701 will register the change with SPMAN 607 and request an acknowledgement (ACK) back from SPMAN 607. Once SP 701 gets this ACK, it will send the ACK to the DB. If the change does not affect customer routing information, SP 701 will simply record the change and send an ACK back to the form (which should then record the change in the DB).

When the form includes a change to a Decision Graph (DG) the SPP will not send the ACK back to the form until the entire DG has been successfully read into SP 701.

3.4.1 DBformUpdate

A form has changed a tuple in a DB table (for this SPA). This message to SPA 609 contains a description of the changes. A DBformUpdate that modifies a SLL table will fail if that table entry is presently "empty".

3.4.2 DBformInsert

The DBformInsert message is used to add customers to an SPA and add entries to SLL tables. An insert for a customer may possibly invoke interaction with SPMAN 607 or the decision graph reader. The response to the form will not be sent until these interactions are completed.

When an insert into an SLL table succeeds, SP 701 will send the table index allocated back to the DB form. Sending the index from SP 701 to the DB form saves the DB form from having to search the entire DB table for an unused table index.

3.4.3 DBformDelete

The DBformDelete message is used to remove customers from an SPA or remove entries from SLL tables. If this customer has any active schedule requests pending, they will be canceled. If the customer being deleted has an active call, that call will continue but no new calls will be started. Even if a call is up, the routing information for that customer will be removed from SPMAN 607's routing tables.

3.5 TTS SCH Interface

The interface between SPA 609 and the portion of CSCF SCH 612 which translates test to speech (TTS SCH) is described below.

3.5.1 Messages from the TTS SCH to the SPA

The messages described below are a subset of all the messages that will be accepted by the SPA 609.

3.5.1.1 SCallocRsp

This message informs SPA 609 that the allocation of a TTS port was successful. The message contains an action identifier, a call identifier, a hardware number of the text-to-speech port, a time stamp of when the TTS port was allocated, and a hardware number of the associated Switch Module port.

3.5.1.2 SCresponse

This message informs SPA 609 that the TTS SCH does not understand the previous message, or that a request has failed. The TTS SCH sends back the action identifier and the call identifier in the message and the type of the message that failed, and a reason code.

3.5.1.3 TTdeallocRsp

This message informs SPA 609 that the TTS port has been deallocated. The message contains an action identifier, a call identifier, a time stamp of when the TTS port was deallocated, and a hardware number of the text-to-speech port.

3.5.1.4 TTsendCompleted

This message informs SPA 609 that the text that was sent in a previous TTsendText message was played on the specified port. The message has an action identifier, a call identifier, a hardware number of the text-m-speech port and a time duration for the time that it took to play the speech.

3.5.1.5 TTsendFailed

This message informs SPA 609 that the text that was sent in a previous TTsendText message failed. The message has an action identifier, a call identifier, a hardware number of the text-to-speech port, a time duration for the time that was used on the resource before the failure occurred, and a reason siring.

3.5.2 Messages from the SPA to the TTS SCH

This section describes the messages that are sent from SPA 609 to the TTS SCH.

3.5.2.1 SCallocate

This message requests that the TTS SCH allocate a TTS port to SPA 609. This message contains an action identifier and a call identifier and a hardware number.

3.5.2.2 SCdeallocate

This message is used by SPA 609 to release the specified port from the TTS SCH's busy list and make it available again. The message contains an action identifier, a call identifier, and a hardware number for a TTS port.

3.5.2.3 TTsendText

This message is used by SPA 609 to send a set of text to the TTS SCH and have it played out a TTS port. The message contains an action identifier, a call identifier, a hardware number for a TTS port, and a boolean flag that indicates if there is more text associated with this command.

3.6 SF SCH Interface

The interface between SPA 609 and the Switch Fabric (SF) SCH 615 is described below.

3.6.1 Messages from SF SCH 615 to SPA 609

The messages described below are a subset of all the messages that will be accepted by the SPA 609 from SF SCH 615 and the Line Interface Handler (LIH). The SF messages are prefixed with the letters SC or SM and the LIH messages are prefixed with the letters LI.

3.6.1.1 LIacceptAck

This message informs SPA 609 that the call has been accepted. The message contains an action identifier, a call identifier, the hardware number of the port, a time stamp, and a call reference number.

3.6.1.2 LIacceptFail

This message informs SPA 609 that SF SCH 615 failed to accept the call. The message contains an action identifier, a call identifier, the hardware number of the port, a time stamp, a call reference number, and a failure return code.

3.6.1.3 LIalerting

This message is sent to SPA 609 to inform it that alert has been received by the BRI handler. The message contains an action identifier, a call identifier, the hardware number of the port that is being referenced, a time stamp, and the call reference number of the port.

3.6.1.4 LIanswerAck

This message is sent to SPA 609 to inform it that the call has been answered successfully. The message contains an action identifier, a call identifier, the hardware number of the port that is being referenced, a time stamp, and the call reference number of the port.

3.6.1.5 LIanswerFail

This message is sent to SPA 609 to inform it that the call has failed to be answered. The message contains an action identifier, a call identifier, the hardware number of the port that is being referenced, a time stamp, and the call reference number of the port and a failure code.

3.6.1.6 LIsetupAck

This message is sent to SPA 609 to inform it that the call is continuing and to give SPA 609 the call reference number associated with the call. The message contains an action identifier, a call identifier, the hardware number of the port that are being referenced, a time stamp, and the call reference number of the call.

3.6.1.7 LIsetupFail

This message is sent to SPA 609 to inform it that the setup has failed. The message contains an action identifier, a call identifier, a time stamp, the hardware number of the port that are being referenced, and a failure return code.

3.6.1.8 LIhangup

This message is sent to SPA 609 to inform it that the call has been disconnected. The message contains an action identifier, a call identifier, the hardware number of the port that is being referenced, a time stamp, and the call reference number of the port.

3.6.1.9 LIselectAck

This message is sent to SPA 609 to inform it of the call reference value that is currently active. The message contains an action identifier, a call identifier, the hardware number of the port that is being referenced, a time stamp, and the new active call reference number of the port. If the call reference value is 0 then no call reference is active.

3.6.1.10 LIselectFail

This message is sent to SPA 609 to inform it of the select message failed. The message contains an action identifier, a call identifier, the hardware number of the port that is being referenced, a time stamp, and the call reference number of the port and a failure return code.

3.6.1.11 LIterminatingCall

This message is sent to SPA 609 when a new call arrives at the SN. The message contains a call identifier, the hardware number of the port that is being referenced, a time stamp, the call reference number of the port, the customer tag, the service key (redirecting DN), the calling number and the called number, 3.6.1.12 LItransferAck This message is sent to SPA 609 to inform SPA 609 that the transfer has succeeded. The message contains an action identifier, a call identifier, the hardware number of the port, a time stamp, (for knowing when the call was taken back by the Central Office), and the call reference numbers for the BRI ports.

3.6.1.13 LItransferFail

This message is sent to SPA 609 to inform SPA 609 that the transfer has failed. The message contains an action identifier, a call identifier, the hardware number of the port, a time stamp, (for knowing when the call was taken back by the Central Office), the call reference numbers for the BRI ports and a failure return code.

3.6.1.14 SMconnectAck

This message is sent to SPA 609 to inform it that the call has been connected as requested. The message contains an action identifier, a call identifier, the four hardware numbers of the ports that were connected, and a time stamp.

3.6.1.15 SMconnectFail

This message is sent to SPA 609 to inform it that the connection request has failed. The message contains an action identifier, a call identifier, the four hardware numbers of the ports that were involved, a time stamp and a failure return code.

3.6.1.16 SMdisconAck

This message is sent to SPA 609 to inform it that the call has been disconnected as requested. The message contains an action identifier, a call identifier, the four hardware numbers of the ports that were connected, and a time stamp.

3.6.1.17 SMdisconFail

This message is sent to SPA 609 to inform it that the connection request has failed. The message contains an action identifier, a call identifier, the four hardware numbers of the ports that were involved, a time stamp and a failure return code.

3.6.2 Messages from the SPA to SF SCH 615

The section below describes the messages that are sent from SPA 609 to SF_SCH 615 SCH and to the Line Interface Handler (LIH).

3.6.2.1 LIacceptCall

This message requests that SF SCH 615 accept the call from the Central Office. The message contains an action identifier, a call identifier, the hardware number of the port, and a call reference number.

3.6.2.2 LIanswer

This message requests that SF SCH 615 answer the call on the given port. The message contains an action identifier, a call identifier, the hardware number of the port, and a call reference number.

3.6.2.3 SMconnect

This message is used to connect two half connections in SF SCH 615. The message contains an action identifier, a call identifier, and four hardware numbers.

3.6.2.4 SMdisconnect

This message releases the port to be put on the available list of resources. The message contains an action identifier, a call identifier, four hardware numbers, and a call reference number.

3.6.2.5 LIselect

This message is used by SPA 609 to select the active call appearance. LIselect with a call reference value of 0 puts the active call on hold. The message contains an action identifier, a call identifier, a hardware number of the port, and the call reference number that is to be active.

3.6.2.6 LIsetup

This message is used by SPA 609 to generate a call on a BRI port to the central office. This message contains an action identifier, a call identifier, an originating Directory Number (DN), a terminating DN, and a hardware number that corresponds to a BRI port. If BRI hardware number already has a call active on it SF SCH 615 will put this call on the same BRI. This is done if SPA 609 is eventually going to transfer the calls on the BRI back to the central office.

3.6.2.7 LIteardown

This message drops the call on the port. The message contains an action identifier, a call identifier, the hardware number of the port, and a call reference number.

3.6.2.8 LItransfer

This message is used to transfer a call from the SN back through the central office. The message contains an action identifier, a call identifier, the hardware number of the port that is involved, and the two call reference numbers for the port. The two calls that use the hardware number are transferred to being directly connected through the central office.

3.7 RWP SCH Interface

The interface between SPA 609 and RWP SCH 603 is described below. This interface may be implemented in the AEX process itself or in a separate process.

3.7.1 Messages from the RWP SCH to the SPA

The messages described below are a subset of all the messages that will be accepted by the SPA 609 from RWP SCH 603.

3.7.1.1 WPdnidReturned

This message returns the white pages database record to SPA 609. The message contains an action identifier, a call identifier, and the database record in name value pair format. If any or all fields are not there in the database, then null values are returned in the message.

3.7.2 Messages from SPA 609 to RWP SCH 603

The section below describes the messages that are sent from SPA 609 to RWP SCH 603.

3.7.2.1 WPdnidLookup

This message is used by SPA 609 to retrieve a white pages database record using the given directory number as a key. The message contains an action identifier, a call identifier, and the directory number that is used as the database key.

3.8 CFTI Interface

The messages that go to the CRFTI subsystem from SPA 609 are described below.

3.8.1 Alarms

Used to tell the craft about a fairly serious problem detected by SPA 609.

3.8.2 CRdebugMsg

This message goes to a craft log maintained by a process in ADMIN 611 and will be used to record any useful debugging information. The message contains a string of characters that are to be printed on the log. SPA 609 will record all unexpected situations in the log using this message. The tester has the ability to turn on and turn off debugging output on an SPA basis using a craft command.

Detailed Example of Execution of a Service by System 601: FIGS. 22–25

The following example will show the manner in which the components of system 601 interchange messages 108 from among those listed above while executing a service. The service is Area Number Calling (ANC), a locator service designed for a subscriber who has a set of service locations for example, pizza restaurants, spread over a wide area. A caller calls one number anywhere in the area, and his/her call is routed to the service location nearest him/her. The caller's location (such as zip code) is found using the calling number and a white pages database, and then a table accessible to SP 701 is used to map that location to the nearest service location. The service uses a decision graph to decide on the actual customer number to call, and uses the Text-To-Speech SCH of CSCF SCH 615 to provide announcements as well as using SF SCH 615 and RWP SCH 603.

The operation of the ANC service is shown in FIGS. 22–25 as a series of frames 2201–2503. The labels used in Frame 1 2201 of FIG. 22 apply to all of the other frames in the figures. Thus, each frame shows the messages 108 exchanged at that point in the execution of the service between SP 701, AEX 703, and RWP SCH process 603, SF SCH process 615, and TTS SCH of CSCF SCH 613. The messages shown being exchanged between DGB 705 and SP 701 in frame 4 2207 are to be understood as messages sent by SP 701 to itself in the course of traversing a decision graph 221.

Figure 22:
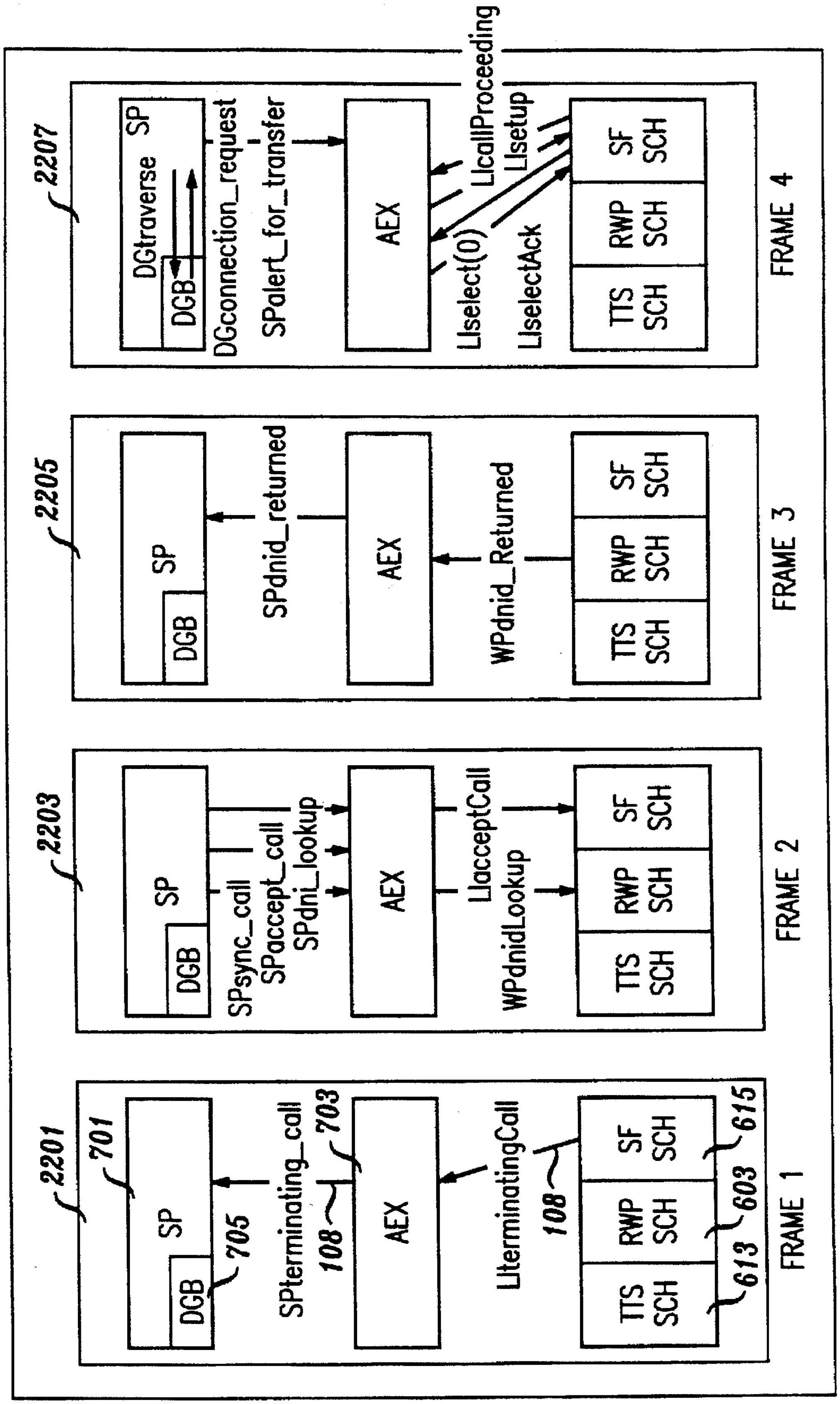
FIG. 22 is a first diagram of frames of an execution of a service.

FIG. 22 Frames 2201 to 2207

FIG. 20 shows the first four frames of the scenario.

1. The calling party (party A) calls the ANC DN. The call is routed to the SN over a BRI and SF SCH 615 sends AEX 703 a "SPterminating_Call" message. (Frame 2201)
2. AEX 703 generates a new call record for the call and then sends the ANC SP 701 a "SPterminating_call" message. (Frame 2201 )
3. SP 701 creates and new call object for the call and sends a "SPsync_call" message to AEX 703 so that the AEX knows SP 701's call object identifier. (Frame 2202)
4. SP 701 sends AEX 703 the "SPaccept_call" message to tell the Central Office (CO) to send audible. (Frame 2202)
5. AEX 703 sends the "LIacceptCall" message to SF SCH 615 to tell the CO to send audible. (Frame 2202)
6. SF SCH 615 sends back a "LIacceptAck" message to the AEX when the operation has been performed. (Frame 2202)
7. SP 701 sends AEX 703 the "SPdnid_lookup" message so that the zipcode of the caller can be found. (Frame 2202)
8. AEX 703 sends the "WPdnidLookup" message to the WP SCH. (Frame 2202)
9. RWP SCH 603 sends back to AEX 703 the "WPdnidReturned" message. (Frame 2205)
10. AEX 703 forwards the information to SP 701 by sending the "SPdnid_returned" to SP 701. (Frame 2205)

11. SP 701 performs a "DGtraverse" action to locate the nearest customer location using the information returned from the white pages database (Frame 2207)
12. Next, the event DGconnection_request is returned to SP 701 by the DGB (Frame 07).
13. SP 701 sends a "SPcall_for_transfer" to AEX 703 indicating that the same BRI port should be used. (Frame 2207)
14. AEX 703 creates an Alert action. The action sends a "LIselect" message to SF SCH 615 to put party A on hold. (Frame 2207)
15. SF SCH 615 sends back a "LIselectAck" message to the AEX when party A is on hold. (Frame 2207)
16. The action sends a "LIsetup" party B message to the SM SCH to originate a call to party B. (Frame 2207)
17. SF SCH 615 originates the call and sends back the "LIsetupAck message that contains the call reference value for the call for party B.(Frame 2207)

Figure 23:
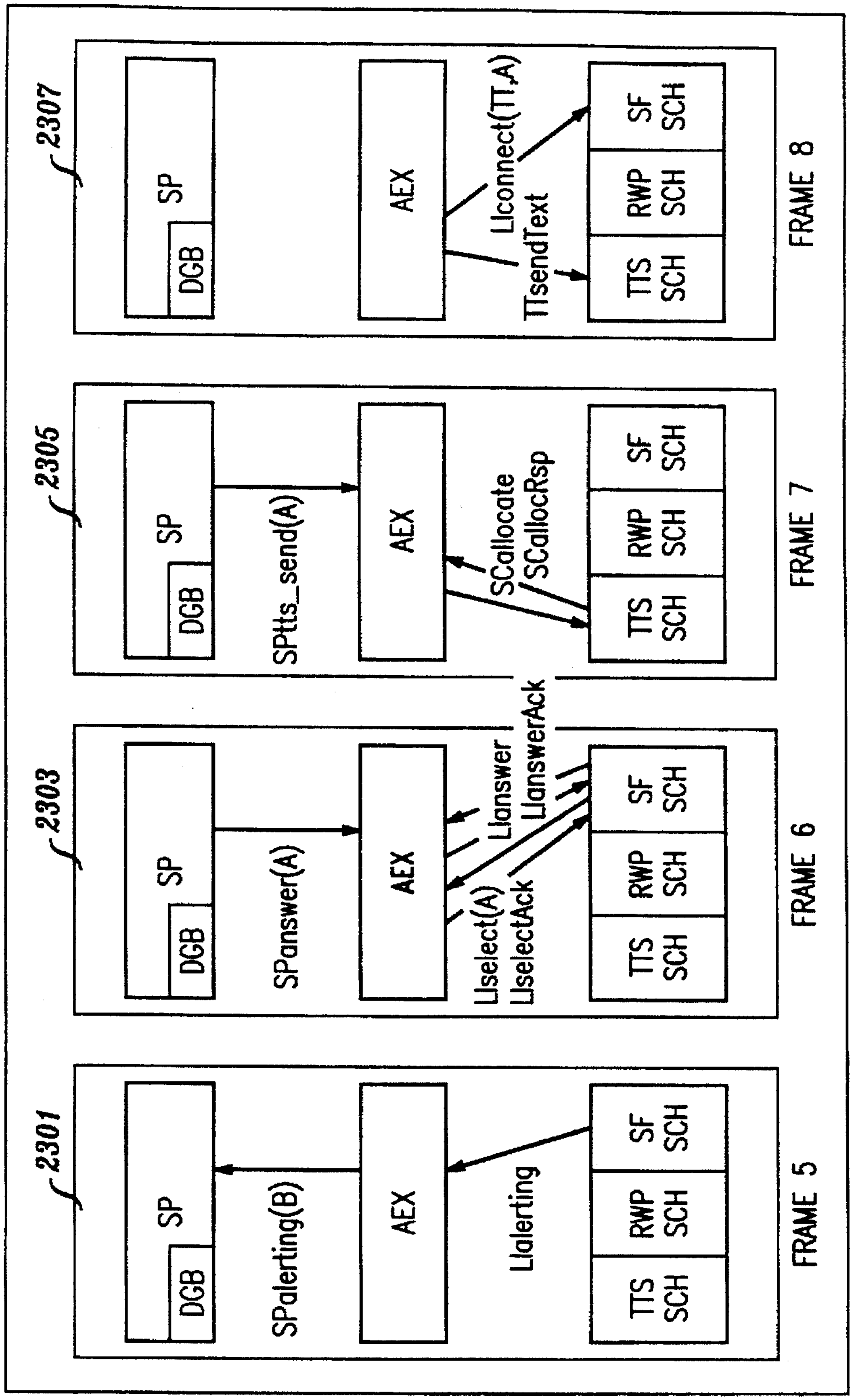
FIG. 23 is a second diagram of frames of an execution of a service.

FIG. 23, Frames 2301 to 2307

FIG. 23 shows the next four frames of the scenario.

18. AEX 703 sends a "SPcall_proceeding" message to SP 701. (Frame 2301) 19. SF SCH 615 sends an "LIalerting" message to AEX 703 indicating that the called party's (B) phone is ringing. (Frame 2301)
20. AEX 703 forwards the message to SP 701 as an "SPcall_alerting" message. (Frame 2301)
21. SP 701 sends "SPanswer" to AEX 703 for party A. (Frame 2303)
22. AEX 703 sends SF SCH 615 the "LIselect" message to put party B on hold and make party A active. (Frame 2303)
23. SF SCH 615 sends AEX 703 the "LIselectAck" message indicating that party A is active. (Frame 2303)
24. AEX 703 sends SF SCH 615 the "LIanswer" message for party A. (Frame 2303)
25. SF SCH 615 sends back "LIanswerAck" to AEX 703. (Frame 2303)
26. SP 701 sends a "SPtts_send" message to AEX 703 to send an announcement to party A, "Thank you for calling Joe's Pizza the next available agent will answer your call". (Frame 2305)
27. AEX 703 now creates a TTS send action. AEX 703 sends a "SCallocate" message to TTS SCH 613. (Frame 2305)
28. TTS SCH 613 back a "SCallocRsp" message to the AEX with the HDW identifier of the TTS port and the HDW identifier for the associated SM SCH port. (Frame 2305)
29. AEX 703 now sends a "LIconnect" to SF SCH 615 to connect the TTS port to the BRI port for party A. (Frame 2307)
30. AEX 703 sends a "TTsendText" to TTS SCH 613. This message contains the text of the announcement. (Frame 2307)

Figure 24:
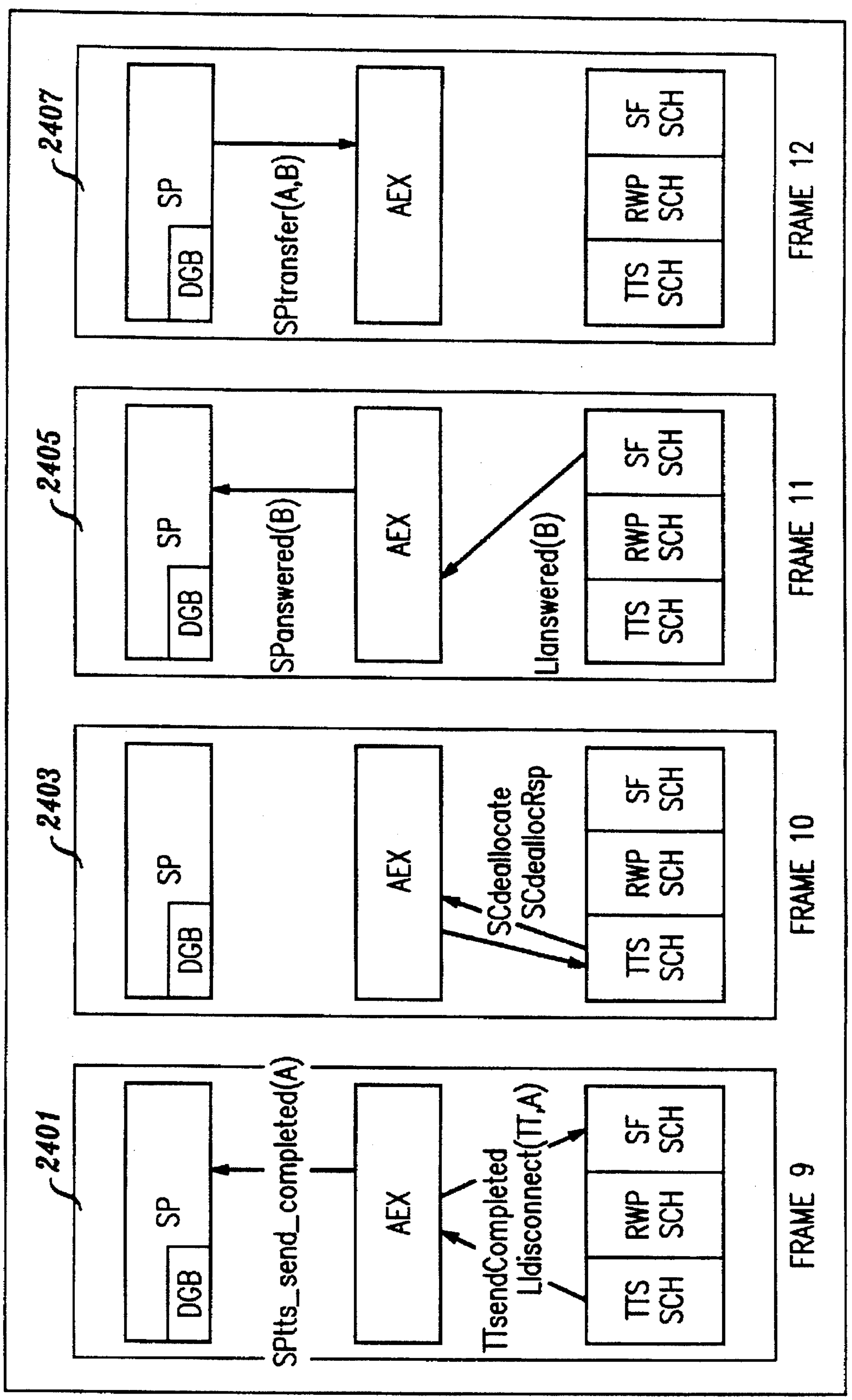
FIG. 24 is a third diagram of frames of an execution of a service.

FIG. 24: Frames 2401 through 2407

FIG. 24 shows frames 2401 through 2407 of the scenario.

31. TTS SCH 613 sends the "TTsendCompleted" message to the AEX when the speech has been pl A. (Frame 2401)
32. AEX 703 sends a "LIdisconnect" message to SF SCH 615 to break the path from TTS SCH 615 port for party A. (Frame 2401)
33. AEX 703 now send a "SPtts_send_completed" message to SP 701 to inform it that the text has. to voice and played to party A. (Frame 240)
34. AEX 703 sends a "SCdeallocate" message to TTS SCH 613 to release the TTS port. (Frame
35. TTS SCH 613 sends a "SCdeallocRsp" message to AEX 703 to indicate that the port was reas the time stamp for the time the port was released. (Frame 2403)
36. The operator at Joe's Pizza answers the phone and the SM SCH sends a "LIanswered" to AEX (Frame 2405)
37. AEX 703 sends a "SPanswered" message for party B to SP 701. (Frame 2405)
38. SP 701 sends a "SPtransfer" message to AEX 703 to transfer the calling party A call to the caller This action will result in the call being moved from the SN back to the CO with party A directly talk (Frame 2407)

Figure 25:
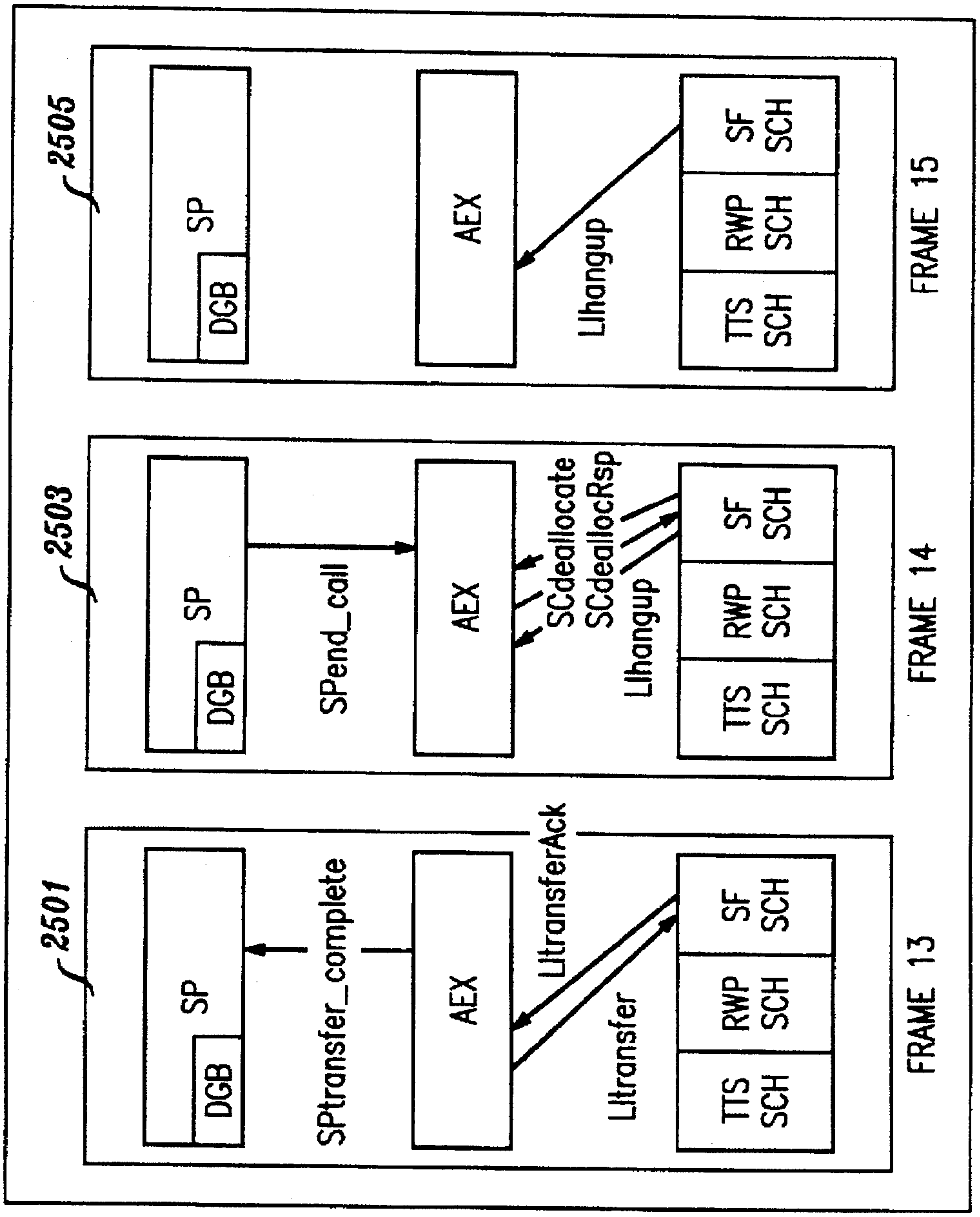
FIG. 25 is a fourth diagram of frames of an execution of a service.
Figure 26:
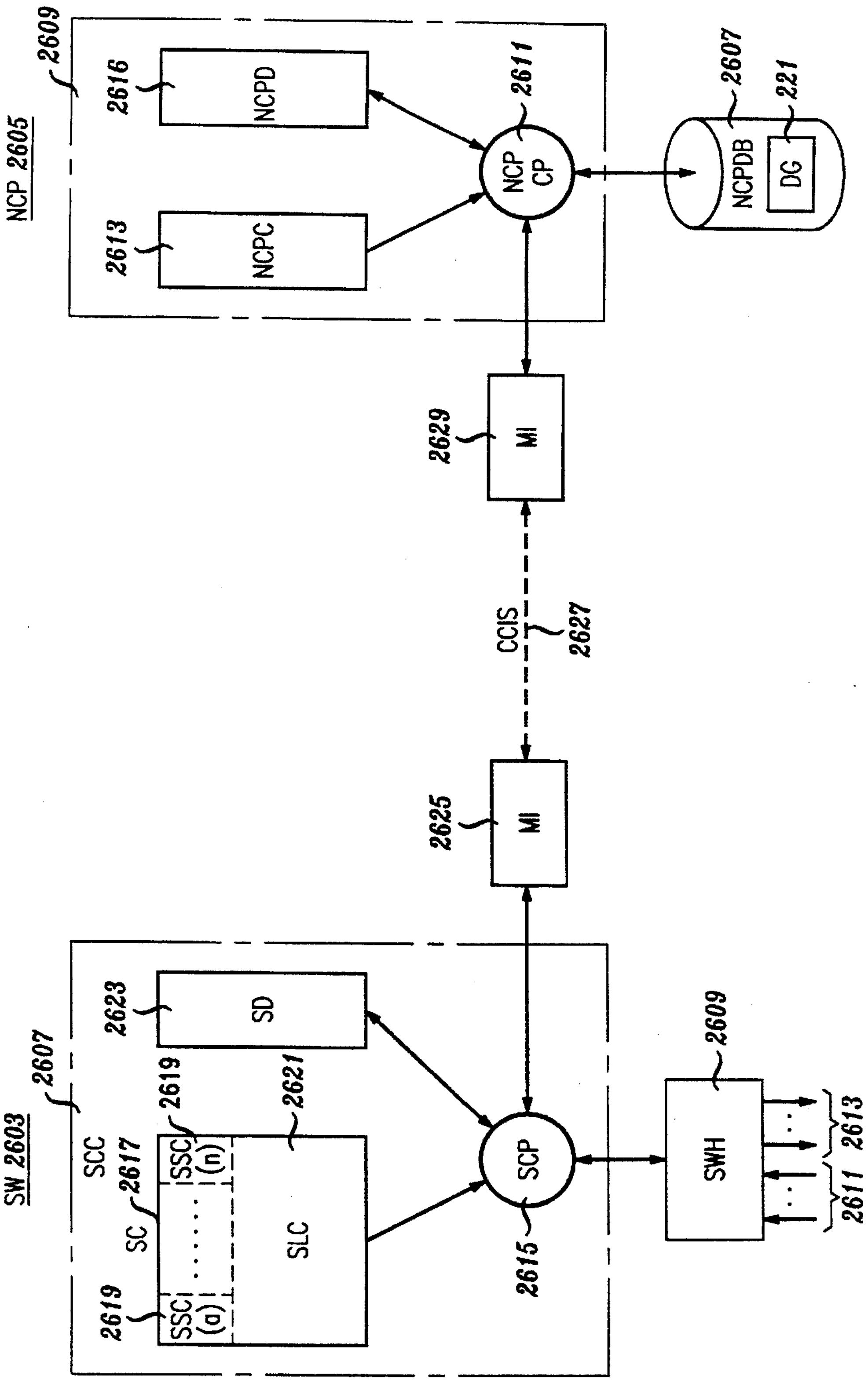
FIG. 26 is a diagram showing prior-art techniques for making modification of services easier.

FIG. 25: Frames 2501 through 2505

FIG. 25 shows the last three frames of the scenario.

39. AEX 703 now sends a "LItransfer" message to the SM SCH to transfer the call from party A to the call to party B. (Frame 2501 )
40. SF SCH 615 sends back to AEX 703 an "LItransferAck" message when the transfer is complete. (Frame 2501)
41. AEX 703 sends the "SPtransfer complete" message to SP 701. (Frame 2501)
42. SP 701 determines that the call is over and sends the AEX the "SPendCall" message. (Frame 2503)
43. AEX 703 receives the "LIhangup" for one of the call references associated with the BRI port. (Frame 2503)
44. AEX 703 receives the "LIhangup" for the other call reference associated with the BRI port. (Frame 2505) This completes the second scenario for Area Number Calling.

Conclusion

The foregoing Detailed Description has provided a general description of apparatus in which the inventions claimed herein are embodied and a detailed description of a preferred embodiment of a service node in a telephone system which employs the principles of the invention. However, as is apparent from the general description, the inventions claimed herein are by no means limited to telephony, but may be employed in any other situation in which a device is controlled by one or more computers to provide services for a plurality of entities.

While the embodiment disclosed herein is the best presently known to the inventors, it will be apparent to those of ordinary skill in the art that many variations which remain within the spirit of the inventions are possible. First, as long as there is a one-to-one correspondence between a service and its service package code, many techniques may be employed for executing the service package. Thus, in a presently-preferred embodiment, there is a service process corresponding to each service, other embodiments may execute all of the code for the service packages in a single process.

Further, in a system involving multiple processes, the control processor may be implemented using many small computers, and a process which corresponds to a service may execute by itself on a single one of such processors. Further, a system 104 or 601 may involve processes other than those disclosed herein and the arrangement of processes used to execute a service may vary from that disclosed herein. For example, in some embodiments, no special message handling process may be required, and in others, the SP process and the AEX process may be combined in a single process or a single system AEX process may serve all of the SP processes.

Additionally, though the service processes in the embodiment disclosed herein execute finite state machines and employ decision graphs, in other embodiments, the code executed by a service process may not define a finite state machine, and may not have decision graphs associated with it. Finally, though the use of the SLL language and of decision graph editors is particularly advantageous, systems embodying the principles of the present invention may be constructed using, any programming language.

As is thus apparent from the foregoing, the Detailed Description is to be understood as being in all respects illustrative and exemplary, but not restrictive, and the scope of the inventor. disclosed herein is to be determined solely from the claims as read in light of this Specification and interpreted according to the doctrine of equivalents.

What is claimed is:

1. A method of controlling a device by means of a computer to provide a plurality of services employing the device for a plurality of entities, the method comprising the steps of:

for each service, providing a copy of the complete code required to define the service, each of said services comprising a service process that includes a first process and a second process, which, when run, cooperate to cause the computer to execute the copy of the code for the service;

for each entity, establishing a correspondence between the entity and only one of the services; and responding to an event message including any one of a plurality of identifiers which identifies one of the entities by causing the computer to execute the code for the service to which the entity corresponds by causing the process corresponding to the service to run.

2. Apparatus for controlling a device by means of a computer to provide a plurality of services employing the device for a plurality of entities, the apparatus comprising:

means for establishing a correspondence between entities and services such that each entity corresponds to only one service;

for each service, a copy of the complete code required to define the service, each of said services comprising a service process that includes a first process and a second process, which, when run, cooperate to cause the computer to execute the copy of the code for the service; and means responsive to any one of a plurality of identifiers identifying a specific entity for causing the computer to execute the copy of the code for the service to which the entity corresponds by causing the process corresponding to the service to run by sending an event message to said process.

3. The apparatus set forth in claim 2 wherein:

the first process executes a first part of the copy of the code and the second process executes a second part of the copy of the code.

4. The apparatus set forth in claim 2 wherein:

the first part of the copy of the code contains a reference to a decision graph which is part of the data associated with the first process; and the first process commences traversal of the decision graph in response to the reference.

5. The apparatus set forth in claim 4 wherein:

the first part of the copy of the code defines a finite state machine which is implemented by the first process; and the decision graph is specified using a graphical interface;

the finite state machine is specified using a finite state machine language; and the second part of the copy of the code is specified using a general-purpose programming language.

6. The apparatus set forth in claim 5 wherein:

the apparatus includes means for specifying the second part of the copy of the code, the first part of the copy of the code, and the decision graph independently of each other.

7. The apparatus set forth in claim 6 wherein:

the means for specifying the decision graph permits specification of the decision graph without stopping execution of the first and second processes.

8. The apparatus set forth in claim 2 wherein:

the means responsive to the identifier for the entity includes a device handler for the device; and the event messages further include event messages from the device handler and from the first and second processes; and the second process responds to event messages from the device handler and the first process and the first process responds to event messages from the second process.

9. The apparatus set forth in claim 8 wherein:

the apparatus further includes an administration process for administering the services; and the first process and the administration process cooperate by means of further event messages.

10. The apparatus set forth in claim 2 wherein:

the first process implements a finite state machine wherein types of event messages are associated with states of the finite state machine; and the first process responds to an event message of a given type when the finite state machine is in the state with which event messages of the given type are associated.

11. The apparatus set forth in claim 2 wherein:

the service process executes the copy of the code in response to typed event messages including an event message from the means responsive to the identifier for the entity;

the service process implements a finite state machine wherein types of event messages are associated with states of the finite state machine; and the service process responds to an event message of a given type when the finite state machine is in the state with which event messages of the given type are associated.

12. The apparatus set forth in claim 11 wherein:

the apparatus includes other processes with which the service process communicates by means of the event messages; and when the service process is being debugged, the other processes include a service debugging process corresponding to the service process which provides an event message to the service process as required to determine how the service process responds to an event message like the provided event message.

13. The apparatus set forth in claim 11 wherein:

a decision graph is associated with the service process and may be traversed by the process in the course of executing the copy of the code; and traversal of the decision graph associated with the service process results in the generation of an event message of a type to which the service process responds.

14. The apparatus set forth in claim 13 wherein:

the decision graph includes a user-defined node; and the event message of the type to which the service process responds is generated in response to a traversal by the service process of the user-defined node.

15. The apparatus set forth in claim 2 wherein:

in executing the copy of the code for the service to which the entity corresponds, the service process employs service data including global data available to all entities corresponding to the service, per-entity data available only to the entity for which the service process is currently executing the copy of the code; and perexecution data which is available only to the entity and only for that execution of the code.

16. The apparatus set forth in claim 15 wherein:

the apparatus includes a service data loading process for providing updates of portions of the non-per-execution service data to the service process; and the code executed by the service process includes service data loading code for loading the updates provided by the service data loading process into the service data, whereby the service data may be updated while the service process is running.

17. The apparatus set forth in claim 15 wherein:

the non-per-execution service data may include one or more decision graphs which are traversed by the process while executing the copy of the code.

18. The apparatus set forth in claim 2 wherein:

the apparatus includes other processes with which the service process communicates by means of messages; and when the service process is being debugged, the other processes include a service debugging process corresponding to the service process which communicates with the service process as required to debug the service process.

19. The apparatus set forth in claim 18 wherein:

the other processes further include an administrative debugging process which receives input from and provides output to a terminal; and the service debugging process communicates with the administrative debugging process as required for the administrative debugging process to output debugging output based on messages from the service debugging process to the terminal and provide messages to the service debugging process based on debugging input received from the terminal.

* * * * *